US006862025B2

(12) United States Patent
Buehler

(10) Patent No.: US 6,862,025 B2
(45) Date of Patent: Mar. 1, 2005

(54) RECURSIVE RAY CASTING METHOD AND APPARATUS

(76) Inventor: David B. Buehler, 893 W. 2150 North, Provo, UT (US) 84604

( * ) Notice: Subject to any disclaimer, the term of this patent is extended or adjusted under 35 U.S.C. 154(b) by 141 days.

(21) Appl. No.: 10/086,620

(22) Filed: Feb. 28, 2002

(65) Prior Publication Data

US 2003/0160787 A1 Aug. 28, 2003

(51) Int. Cl.$^7$ .............................................. G06T 17/00
(52) U.S. Cl. ....................... 345/424; 345/420; 345/423; 345/426; 345/421
(58) Field of Search ............................... 345/420, 421, 345/422, 424, 440, 423, 426

(56) References Cited

U.S. PATENT DOCUMENTS

| | | | | |
|---|---|---|---|---|
| 5,442,733 A | * | 8/1995 | Kaufman et al. | 345/424 |
| 5,579,455 A | * | 11/1996 | Greene et al. | 345/422 |
| 6,115,485 A | | 9/2000 | Dumoulin et al. | 382/128 |
| 6,285,378 B1 | | 9/2001 | Duluk, Jr. | 345/441 |
| 6,313,838 B1 | * | 11/2001 | Deering | 345/420 |
| 6,430,589 B1 | * | 8/2002 | Jennings, III | 708/620 |
| 6,445,391 B1 | * | 9/2002 | Sowizral et al. | 345/421 |
| 6,476,806 B1 | | 11/2002 | Cunniff et al. | 345/421 |
| 6,597,359 B1 | * | 7/2003 | Lathrop | 345/440 |
| 6,646,639 B1 | | 11/2003 | Greene et al. | 345/422 |

OTHER PUBLICATIONS

Debrin, Robert A., Loren Carpenter, and Pat Hanrahan. "Volume Rendering," *Computer Graphics*, vol. 22, No. 4, Aug. 1988, pp. 65–74.

Vezina, Guy, Peter A. Fletcher, and Philip K. Robertson. "Volume Rendering on the MasPar MP–1," CSIRO Division of Information Technology, Australia, Workshop on Volume Visualization, Boston, Mass., 1992, pp. 3–8.

Novins, Kevin L., Francois X. Sillion, and Donald P. Greenberg. "An Efficient Method for Volume Rendering Using Perspective Projection," *Computer Graphics*, vol. 24, No. 5, Nov. 1990, pp. 95–100.

Totsuka, Takashi, and Marc Levoy. "Frequency Domain Volume Rendering," Proc. from Computer Graphics Annual Conference Series, SIGGRAPH 93, Anaheim, CA, Aug. 1–6, 1993, pp. 271–278.

Lacroute, Philippe, and Marc Levoy. "Fast Volume Rendering Using a Shear–Warp Factorization of the Viewing Transformation," Proc. from Computer Graphics Annual Conference Series, SIGGRAPH 94, Orlando, Flor., Jul. 24–29, 1994, pp. 456–457.

Levoy, Marc. "Efficient Ray Tracing of Volume Data," *ACM Transactions on Graphics*, vol. 9, No. 3, Jul. 1990, pp. 245–261.

Levoy, Marc. "Volume Rendering by Adaptive Refinement," *The Visual Computer*, 1990, pp. 2–7.

Wilhelms, Jane, and Allen Van Gelder. "Octrees for Faster Isosurface Generation Extended Abstract," *Computer Graphics*, vol. 24, No. 5, Nov. 1990, pp. 57–62.

Office Action received for 10/086,481.

Office Action received for 10/086,481.

Office Action received for 10/086,466.

* cited by examiner

*Primary Examiner*—Kimbinh T. Nguyen
(74) *Attorney, Agent, or Firm*—Kunzler & Associates; Steven F. McDaniel

(57) ABSTRACT

A recursive ray casting method and apparatus is described that increases casting and visible object determination efficiency by casting entire bundles of rays relatively large distances and subdividing into smaller bundles and casting distances when within a certain proximity of graphical objects. A bundle caster recursively advances the position of a ray bundle. A proximity tester receives the position and returns a hit signal if the position is proximate to an object. A ray caster recursively advances the position of an individual ray. A collision tester receives the position of the individual ray and returns a hit signal if the ray impinges upon an object. The ray caster and the bundle caster communicate with an occlusion detector to eliminate unnecessary casting of rays and bundles and thereby conduct gated pixelization of graphical objects.

23 Claims, 24 Drawing Sheets

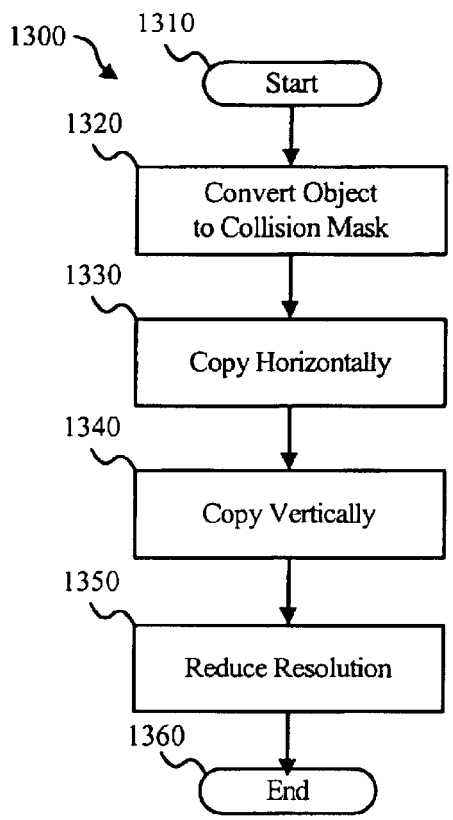
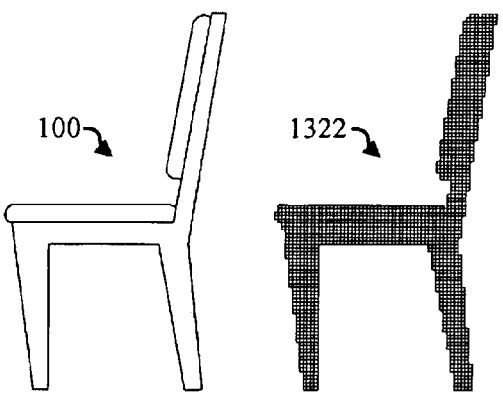
Fig. 13a    Fig. 13b    Fig. 13c
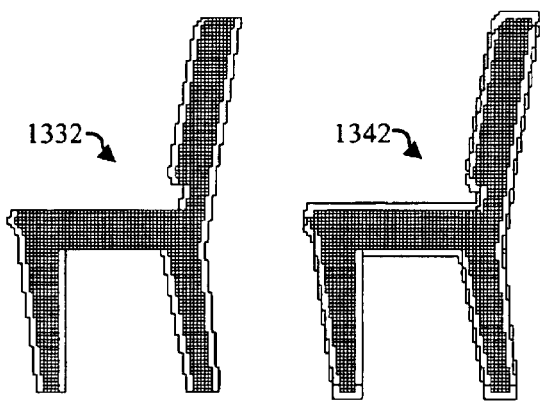
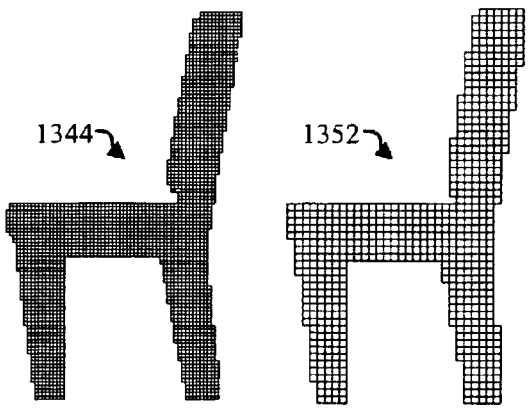
Fig. 13d    Fig. 13e    Fig. 13f    Fig. 13g

RECURSIVE RAY CASTING METHOD AND APPARATUS

BACKGROUND OF THE INVENTION

1. The Field of the Invention

The present invention relates generally to graphical rendering devices and systems. Specifically, the invention relates to devices and systems for conducting highly realistic three-dimensional graphical renderings.

2. The Relevant Art

Graphical rendering involves the conversion of one or more object descriptions to a set of pixels that are displayed on an output device such as a video display or image printer. Object descriptions are generally mathematical representations that model or represent the shape and surface characteristics of the displayed objects. Graphical object descriptions may be created by sampling real world objects and/or by creating computer-generated objects using various editors.

In geometric terms, rendering requires representing or capturing the details of graphical objects from the viewer's perspective to create a two-dimensional scene or projection representing the viewer's perspective in three-dimensional space. The two-dimensional rendering facilitates viewing the scene on a display device or means such as a video monitor or printed page.

A primary objective of object modeling and graphical rendering is realism, i.e., a visually realistic representation that is life-like. Many factors impact realism, including surface detail, lighting effects, display resolution, display rate, and the like. Due to the complexity of real-world scenes, graphical rendering systems are known to have an insatiable thirst for processing power and data throughput. Currently available rendering systems lack the performance necessary to make photo-realistic renderings in real-time.

To increase rendering quality and reduce storage requirements, surface details are often separated from the object shape and are mapped onto the surfaces of the object during rendering. The object descriptions including surface details are typically stored digitally within a computer memory or storage medium and referenced when needed.

One common method of representing three-dimensional objects involves combining simple graphical objects into a more realistic composite model or object. The simple graphical objects, from which composite objects are built, are often referred to as primitives. Examples of primitives include triangles, surface patches such as bezier patches, and voxels.

Voxels are volume elements, typically cubic in shape, that represent a finite, three-dimensional space similar to bitmaps in two-dimensional space. Three-dimensional objects may be represented using a primitive comprising a three-dimensional array of voxels. A voxel object is created by assigning a color and a surface normal to certain voxel locations within the voxel array while marking other locations as transparent.

Voxel objects reduce the geometry bandwidth and processing requirements associated with rendering. For example, objects represented with voxels typically have smaller geometry transform requirements than similar objects constructed from triangles. Despite this advantage, existing voxel rendering algorithms are typically complex and extremely hardware intensive. A fast algorithm for rendering voxel objects with low hardware requirements would reduce the geometry processing and geometry bandwidth requirements of rendering by allowing certain objects to be represented by voxel objectss instead of many small triangles.

As mentioned, rendering involves creating a two-dimensional projection representing the viewer's perspective in a three-dimensional space. One common method of creating a two-dimensional projection involves performing a geometric transform on the primitives that comprise the various graphical objects within a scene. Performing a geometric transform changes any coordinates representing objects from an abstract space known as a world space into actual device coordinates such as screen coordinates.

After a primitive such as a triangle has been transformed to a device coordinate system, pixels are generated for each pixel location which is covered by that primitive. The process of converting graphical objects to pixels is sometimes referred to as rasterization or pixelization. Texture information may be accessed in conjunction with pixelization to determine the color of each of the pixels. Because more than one primitive may be covering any given location, a z-depth for each pixel generated is also calculated, and is used to determine which pixels are visible to the viewer.

FIGS. 1a and 1b depict a simplified example of graphical rendering. Referring to FIG. 1a, a graphical object 100 may be rendered by sampling attributes such as object color, texture, and reflectivity at discrete points on the object. The sampled points correspond to device-oriented regions, typically round or rectangular in shape, known as pixels 102. The distance between the sampled points is referred to herein as a sampling interval 104. The sampled attributes, along with surface orientation (i.e. a surface normal), are used to compute a rendered color 108 for each pixel 102. The rendered colors 108 of the pixels 102 preferably represent what a perspective viewer 106 would see from a particular distance and orientation relative to the graphical object 100.

As mentioned, the attributes collected by sampling the graphical object 100 are used to compute the rendered color 108 for each pixel 102. The rendered color 108 differs from the object color due to shading, lighting, and other effects that change what is seen from the perspective of the viewer 106. The rendered color 108 may also be constrained by the selected rendering device. The rendered color may be represented by a set of numbers 110 designating the intensity of each of the component colors of the selected rendering device, such as red, green, and blue on a video display or cyan, magenta, yellow, and black on an inkjet printer.

As the graphical object 100 is rendered with each frame, the positioning and spacing of the discreet sampling points (i.e., the pixels 102) projected onto the graphical object 100 determine what is seen by the perspective viewer 106. One method of rendering, referred to as ray tracing, involves determining the position of the discreet sampling points by extending a grid 111 of rays 112 from a focal point 114 to find the closest primitive each ray intersects. Since the rays 112 are diverging, the spacing between the rays 112, and therefore the size of the grid 111, increases with increasing distance. Ray tracing, while precise and accurate, is generally not used in real-time rendering systems due to the computational complexity of currently available ray tracing algorithms.

The grid 111, depicted in FIG. 1a, is a set of regularly spaced points corresponding to the pixels 102. The points of the grid 111 lie in an image plane perpendicular to a ray axis 115. The distance of each pixel 102 from a reference plane perpendicular to the ray axis 115, such as the grid 111, is known as the pixel depth or z-depth. The distance or depth of the graphical object 100 changes the level of detail seen by the perspective viewer 106. Relatively distant objects cover a smaller rendering area on the display device, resulting in a reduced number of rays 112 that reach the graphical object 100, and an increased sampling interval 104.

Visual artifacts occur when the spacing between the rays 112 result in the sampling interval 104 being too large to faithfully capture the details of the graphical object 100. A number of methods have been developed to eliminate visual artifacts related to large sampling intervals. One method, known as super-sampling, involves rendering the scene at a higher resolution than the resolution used by the output device, followed by a smoothing or averaging operation to combine multiple rendered pixels into a single output pixel.

Another method, developed to represent objects at various distances and sampling intervals faithfully, involves creating multiple models of a given object. Less detailed models are used when an object is distant, while more detailed models are used when an object is close. Texture information may also be stored at multiple resolutions. During rendering, the texture map appropriate for the distance from the viewer is utilized.

The graphical objects, and portions thereof, that are visible to a viewer are dependent upon the perspective of the viewer. Referring to FIG. 1b, a graphical scene 150 may include a variety of the graphical objects 100, some of which may be visible while others may be obstructed. Unobstructed objects are often designated as foreground objects 100a, while partially obstructed objects may be referred to as background objects 100b. Within the graphical scene 150, completely obstructed objects may be referred to as non-visible objects.

During rendering, the graphical scene 150 is converted to rendered pixels on a rendering device for observance by an actual viewer. Each rendered pixel preferably contains the rendered color 108 such that the actual viewer's visual perception of each graphical object 100 is that of the perspective viewer 106.

A small percentage of the graphical objects 100 may be visible within a particular graphical scene. For example, the room shown within the graphical scene 150 may be one of many rooms within a database containing an entire virtual house. The rendering of non-visible objects and pixels unnecessarily consumes resources such as processing cycles, memory bandwidth, memory storage, and function specific circuitry. Since the relative relationship of graphical objects changes with differing perspectives, for example as the perspective viewer 106 walks through a virtual house, the ability to dynamically determine and prune non-visible objects and pixels improves rendering performance.

Ray casting is a method to determine visible objects and pixels within a graphical scene 150 as shown in FIG. 1a. Ray casting is one method of conducting ray tracing that advances (casts) one ray for each pixel within the graphical scene 150 from the perspective viewer 106. With each cast one or more graphical objects are tested against each ray to see if the ray has "collided" with the object—an extremely processing-intensive procedure.

Z-buffering is another method that is used to determine visible pixels. Pixels are generated from each potentially visible object and stored within a z-buffer. A z-buffer typically stores a depth value and a pixel color value at a memory location corresponding to each x,y position within the graphical scene 150. A pixel color value is overwritten with a new value only if the new pixel depth is less than the depth of the currently stored pixel.

Referring to FIG. 2, a method of rendering known as post z-buffer shading and texturing defers shading and texturing operations within a rendering pipeline 200 and therefore does not texture or shade non-visible pixels. In a typical rendering system, the color of the pixels is calculated prior to z-buffering. In a post z-buffer shading and texturing system, such as the rendering pipeline 200, final color calculations are not performed until after the z-buffering operation. Deferred shading and texturing eliminates the memory lookups and processing operations associated with shading and texturing non-visible pixels and thereby facilitates increased system efficiency.

The rendering pipeline 200 includes a display memory 210 and a graphics engine 220 comprised of a triangle converter 230, a z-buffer 240, and a shading and texturing engine 250. The rendering pipeline 200 also includes a frame buffer 260. In the depicted embodiment, the display memory 210 receives and provides various object descriptors 212 that describe the graphical objects 100.

The display memory 210 preferably contains descriptions of those objects that are potentially visible in the graphical scene 150. With scene changes, the object descriptors 212 may be added or removed from the display memory 210. In some embodiments, the display memory 210 contains a database of the object descriptors 212, for example, a database describing an entire virtual house.

Some amount of simple pruning may be conducted on objects within the display memory 210, for example, by software running on a host processor. Simple pruning may be conducted so that the graphical objects that are easily identified as non-visible are omitted from the rendering process. For example, those graphical objects 100 that are completely behind the perspective viewer 106 may be omitted or removed from the display memory 210.

The graphics engine 220 retrieves the object descriptors 212 from the display memory 210 and presents them to the triangle converter 230. In the depicted embodiment, the object descriptors 212 define the vertices of a triangle or set of triangles and their associated attributes such as the object color. Typically, these attributes are interpolated across the face of the triangle to provide a set of potentially visible pixels 232.

The potentially visible pixels 232 are received by the z-buffer 240 and processed in the manner previously described to provide the visible pixels 242 to the shading and texturing engine 250. The shading and texturing engine 250 textures and/or shades the visible pixels 242 to provide rendered pixels 252 that are collected by the frame buffer 260 to provide one frame of pixels 262. The framed pixels 262 are typically sent to a display system for viewing.

One difficulty in conducting post z-buffer shading and texturing is the increased complexity required of the z-buffer. The z-buffer is required to contain additional information relevant to shading and texturing in addition to the pixel depth. The z-buffer is often a performance critical element, in that each pixel is potentially updated multiple times, requiring increased bandwidth. The increased size and bandwidth requirements on the z-buffer have limited the use of post z-buffer shading and texturing within graphical systems.

One prior art method to reduce the size of the z-buffer is shown in FIG. 3. The method divides a screen 300 into tiles 310. The tiles 310 and the screen 300 consist of a plurality of scanlines 320. Each tile 310 is rendered as if it were the entire screen 300, thus requiring a tile-sized z-buffer. While a tile-sized z-buffer requires less memory, a tile-sized z-buffer increases complexity related to sorting, storing, accessing, and rendering the object descriptors 212 within the display memory 210. The increased complexity results from objects that overlap more than one tile.

While many advances have been made to graphical rendering algorithms and architectures, including those depicted in the graphical pipeline 200, real-time rendering of photo-realistic life-like scenes requires the ability to render greater geometric detail than is sustainable on currently available graphical rendering systems.

Therefore, what is generally needed are methods and apparatus to conduct efficient graphical rendering. Specifically, what is needed is a graphical system that renders voxel primitives efficiently. The ability to render voxel objects efficiently increases the detail achievable in real-time graphical rendering systems.

What is also needed is a graphical system that renders very detailed scenes with extensive depth complexity, without tying up external memory interfaces with z-buffer data traffic. A z-buffering apparatus and method that facilitates large tiles, supports a high pixel throughput, is compact enough to reside entirely on-chip, and reduces external memory bandwidth requirements would facilitate such a system.

In addition to better z-buffering, a method and apparatus are needed that reduce the bandwidth load on the z-buffer. Specifically, what is needed is a method and apparatus that reduces the generation of non-visible pixels prior to z-buffering.

In addition to more intelligent pixel generation, rendering highly realistic scenes requires accessing large amounts of texture and world description data. Specifically, what is needed is an apparatus and method to maximize the efficiency of internal and external memory accesses. Such a method and apparatus would preferably achieve increased realism by facilitating larger stores of texture data within low-cost external memories, while maintaining a high data throughput within the rendering pipeline.

Lastly, what is needed is a graphical processing architecture that facilitates combining the various elements of the present invention into an efficient rendering pipeline that is scalable in performance.

OBJECTS AND BRIEF SUMMARY OF THE INVENTION

The apparatus of the present invention has been developed in response to the present state of the art, and in particular, in response to the problems and needs in the art that have not yet been fully solved by currently available graphical rendering systems and methods. Accordingly, it is an overall object of the present invention to provide an improved method and apparatus for graphic rendering that overcomes many or all of the above-discussed shortcomings in the art.

To achieve the foregoing objects, and in accordance with the invention as embodied and broadly described herein in the preferred embodiments, an apparatus and method for improved graphical rendering is described. The apparatus and method facilitate increased rendering realism by supporting greater geometric detail, efficient voxel rendering, larger amounts of usable texture data, higher pixel resolutions including super-sampled resolutions, increased frame rates, and the like.

In a first aspect of the invention, a method and apparatus for casting ray bundles is described that casts entire bundles of rays relatively large distances. The ray bundles are subdivided into smaller bundles and casting distances as the rays and bundles approach a graphical object. Each bundle advances in response to a single test that is conducted against a proximity mask corresponding to a particular proximity. Sharing a single proximity test among all the rays within a bundle greatly reduces the processing burden associated with ray tracing. Individual rays are generated when a ray bundle is within close proximity to the object being rendered. The method and apparatus for casting ray bundles efficiently calculates the first ray intersections with an object and is particularly useful for voxel objects.

In a second aspect of the invention, a method and apparatus for gated pixelization (i.e., selective pixel generation) is described that conducts z-buffering at a coarse depth resolution using minimum and maximum depths for a pixel set. In one embodiment, the method and apparatus for gated pixelization maximizes the utility of reduced depth resolution by shifting the range of depths stored within the z-buffer in coordination with the depth of the primitives being processed. The method and apparatus for gated pixelization also reduces the bandwidth and storage burden on the z-buffer and increases the throughput of the pixel generators.

In a third aspect of the invention, a method and apparatus for z-buffering pixels is described that stores and sorts the pixels from an area of the screen, such as a tile, into relatively small regions, each of which is processed to determine the visible pixels in each region. The method and apparatus facilitates high throughput z-buffering, efficient storage of pixel auxiliary data, as well as deferred pixel shading and texturing.

In a fourth aspect of the invention, an apparatus and method for sorting memory accesses related to graphical objects is described that increases the locality of memory references and thereby increases memory throughput. In the presently preferred embodiment, access requests for a region of the screen are sorted and stored according to address, then accessed page by page to minimize the number of page loads that occur. Minimizing page loads maximizes the utilization of available bandwidth of graphical memory interfaces.

The various aspects of the invention are combined in a pipelined graphics engine designed as a core of a graphics subsystem. In the presently preferred embodiment, graphical rendering is tile-based and the pipelined graphics engine is configured to efficiently conduct tile-base rendering.

The graphics engine includes a set of pixel generators that operate in conjunction with one or more occlusion detectors. The pixel generators include voxel ray tracers, which use the method and apparatus for casting ray bundles to greatly reduce the number of computations required to determine visible voxels. In the preferred embodiment, the voxel objects are stored and processed in a compressed format.

The voxel ray tracers generate pixels from voxel objects by calculating ray collisions for the voxel objects being rendered. Proximity masks are preferably generated previous to pixel generation. Each proximity mask indicates the voxel locations that are within a certain distance of a nontransparent voxel. The proximity masks are brought in from external memory and cached as needed during the rendering process. An address that references the color of the particular voxel impinged upon by each ray is also calculated and stored within a pixel descriptor.

The voxel ray tracers conduct ray bundle casting to efficiently determine any first ray intersections with a particular voxel object. The voxel ray tracers are preferably configured to conduct perspective ray tracing where the rays diverge with each cast.

Ray tracing commences by initializing the direction of the rays in the voxel object's coordinate system, based on the voxel object's orientation in world space and the location of the viewer. The casting direction of each ray bundled is represented by a single directional vector. A bundle width and height corresponding to a screen region represent the bundle size. In the preferred embodiment, a top level bundle may comprise 100 or more rays.

Each ray bundle is advanced by casting the bundle in the direction specified by the directional vector a selected casting distance. A proximity mask is selected for testing that preferably indicates a proximity to the object surface that corresponds with the selected casting distance. The single test against the properly selected proximity mask ensures that none of the rays in a bundle could have intersected the object between the last test and the current test.

A positive proximity test indicates that at least one ray is within a certain distance of the object surface. In response to a positive proximity test, the ray bundle is preferably subdivided into smaller bundles that are individually advanced, tested, and subdivided until each bundle is an individual ray. The individual rays are also advanced and tested against a collision mask that indicates impingement of the ray on a non-transparent voxel of the object of interest. Upon impingement, a color lookup address for the impinged voxel is calculated, and stored along with x and y coordinates in the pixel descriptor.

The method and apparatus for casting ray bundles has several advantages and is particularly useful for voxel objects. Casting is very efficient, in that the majority of tests performed (for each ray that intersects the surface) are shared by many other rays within each bundle the ray was a member of. The proximity mask information is compact, particularly when compressed, and may be cached on-chip for increased efficiency. The algorithm is also memory friendly, in that only those portions of the object that are potentially visible need be brought onto the chip i.e. efficiency is maintained with partial view rendering. Perhaps the greatest advantage, particularly when conducted in conjunction with voxel objects, is a substantial reduction in the number of, and the bandwidth required for, geometry calculations within highly detailed scenes. The recursive subdividing nature of the algorithm also facilitates parallel execution, which in certain embodiments facilitates computing multiple ray intersections per compute cycle.

The pixel generators, such as the voxel ray tracers, generate potentially visible pixels, working in conjunction with the occlusion detector. The occlusion detector conducts depth checking at a coarse depth resolution in order to gate the pixel generators, thereby allowing the pixel generators to skip generating pixels for locations known to be occluded by a previously processed pixel. The preferred embodiment of the occlusion detector performs a parallel comparison of all the depth values within a region to a given value, and returns a mask indicating the pixel locations that are occluded at that depth. The pixel generators use the mask information to generate only pixels that are not known to be occluded. Using the occlusion detectors to conduct pixel gating reduces the overall processing and storage burden on the z-buffer.

In the preferred embodiment, the occlusion detector is used in conjunction with front-to-back rendering of the graphical primitives that comprise a scene. In certain embodiments, the occlusion detector is capable of shifting the depth range in which occlusions are detected. Depth shifting focuses the available resolution of the occlusion detector on a limited depth range. Depth shifting is preferably conducted in conjunction with depth ordered rendering. Information from the occlusion detector may also be used to gate the processing of geometric primitives.

The pixel generators and the occlusion detectors coordinate to conduct gated pixelization and provide potentially visible pixels to a sorting z-buffer. The sorting z-buffer includes a region sorter, a region memory, and a region-sized z-buffer. The region sorter sorts the potentially visible pixels according to their x,y coordinates within a screen or tile to provide sorted pixels. The sorted pixels corresponding to each region within a graphical scene or tile are received and processed by a region-sized z-buffer to provide the visible pixels.

In the preferred embodiment, the region sorter is a hardware bucket sorter. The bucket sorter operates by storing the pixels as they arrive in temporary buffers, which are transferred in parallel into the region memory when full. Additional stages of bucket sorting may be conducted by sorting pixels stored within the region memory.

Sorting the pixels into regions facilitates the use of a very small z-buffer at the core of the sorting z-buffer. The screen regions corresponding to the region-sized z-buffer are preferably smaller than the tiles typical of rendering systems. Sorting the pixels into regions also facilitates the use of larger tiles. Larger tiles reduce the number of graphic primitives that overlap more than one tile.

In one embodiment, using a region-sized z-buffer within the sorting z-buffer facilitates rendering without tiling. Using a region-sized z-buffer has the additional advantage of facilitating dynamic adjustment of the size of the tile, as well as handling more than one pixel in the z-buffer for a given location within the region—a useful feature for processing semi-transparent pixels. Using a region-sized z-buffer also facilitates handling a large number of pixels per cycle. The pixels may be randomly placed within a tile and need not be stored or accessed in any particular order.

In the preferred embodiment, the bucket sorter stores the received pixels by conducting a parallel transfer to the region memory. Since the pixels may originate from the same primitive, the received pixels often have a certain amount of spatial coherence. In the preferred embodiment, the bucket sorter exploits spatial coherence by conducting a first level of bucket sorting as the pixels arrive. Additional levels of bucket sorting may be performed by recursively processing the contents of the region memory.

A further stage of the sorting z-buffer is the pixel combiner. The pixel combiner monitors the pixels provided by the sorting z-buffer. In those instances where super-sampled anti-aliasing is performed, combining is conducted on those pixels that can be combined without loss of visual quality. Combining is preferred for super-sampled pixels combined without loss of visual quality. Combining is preferred for super-sampled pixels that reference the same texture. Combining reduces the load on the colorization engine and the anti-aliasing filter.

The sorting z-buffer provides visible pixels to a colorization engine. The colorization engine colorizes the pixels to provide colorized pixels. In the present invention, colorizing may comprise any operation that affects the rendered color of a pixel. In one embodiment, the colorizing of pixels includes shading, texturing, normal perturbation (i.e. bump mapping), as well as environmental reflectance mapping. Colorizing only those pixels that are visible reduces the processing load on the colorization engine and reduces the bandwidth demands on external texture memory.

The colorization engine colorizes pixels using a set of pixel colorizers, an attribute request sorter, and a set of attribute request queues. The graphics engine may also include or be connected to a pixel attribute memory containing pixel attributes that are accessed by the pixel colorizers in conjunction with colorization. Voxel color data is preferably stored in a packed array so that only nontransparent voxels on the surface of an object need be stored. Surface normal information is also stored along with the color.

The attribute request sorter routes and directs the attribute requests relevant to pixel colorization to the various attribute request queues. In one embodiment, the attribute request sorter sorts the attribute requests according to the memory page in which the requested attribute is stored, and the attribute request sorter routes the sorted requests to the pixel attribute memory.

Sorting the attribute requests increases the performance and/or facilitates the use of lower cost storage by increasing the locality of memory references. In one embodiment, increasing the locality of memory references facilitates using greater quantities of slower, less costly dynamic random access memory (DRAM) within a memory subsystem while maintaining equivalent data throughput.

In the preferred embodiment, the last portion in the pipeline is the anti-aliasing filter. In those instances where super-sampling is performed, multiple super-sampled pixels are combined to provide rendered pixels. The rendered pixels are stored in the frame buffer and used to provide a high quality graphical rendering.

The various elements of the graphics engine work together to accomplish high performance, highly detailed rendering using reduced system resources. Pixel descriptors are judiciously generated in the pixelizers by conducting gated pixelization. Each pixel descriptor, though grouped with other pixels of the same screen region, flows independently through the various pipeline stages. Within each pipeline stage, the number of processing units operating in parallel is preferably scalable in that each pixel is directed to an available processing unit.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 13a is a flow chart diagram depicting one embodiment of a proximity mask generation method in accordance with the present invention;

FIG. 13b is a side view of an object being rendered;

FIGS. 13c–g are illustrations of various stages in the mask generation process;

DETAILED DESCRIPTION OF THE PREFERRED EMBODIMENTS

Figure 4A:
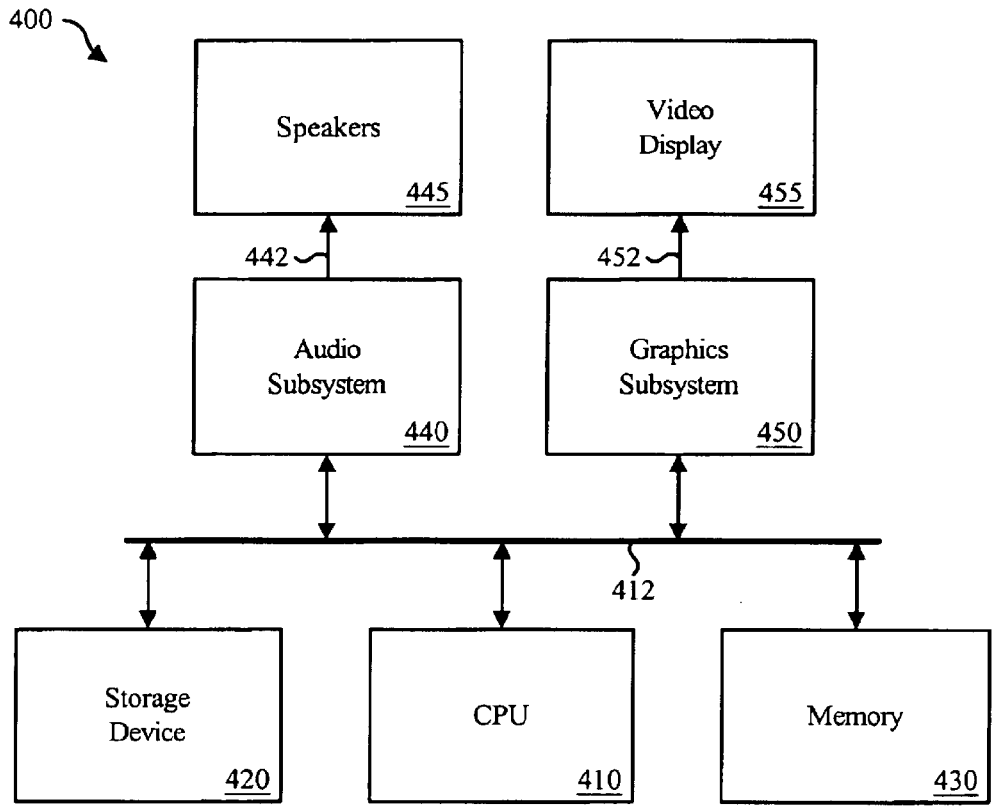
FIG. 4a is a schematic block diagram depicting one embodiment of a graphical rendering system in accordance with the invention.

Referring to FIG. 4a, a digital media system 400 in accordance with the present invention may include a CPU 410, a storage device 420, a memory 430, an audio subsystem 440, and a graphics subsystem 450, interconnected by a system bus 412. In addition, the graphical rendering system 400 may include speakers 445 and a video display 455. In the depicted embodiment, the speakers 445 receive and play an audio signal 442 from the audio subsystem 440, while the video display 455 receives and displays a video signal 452 from the graphics subsystem 450. The digital media system 400 may be a multimedia system such as a game console or personal computer.

Figure 4B:
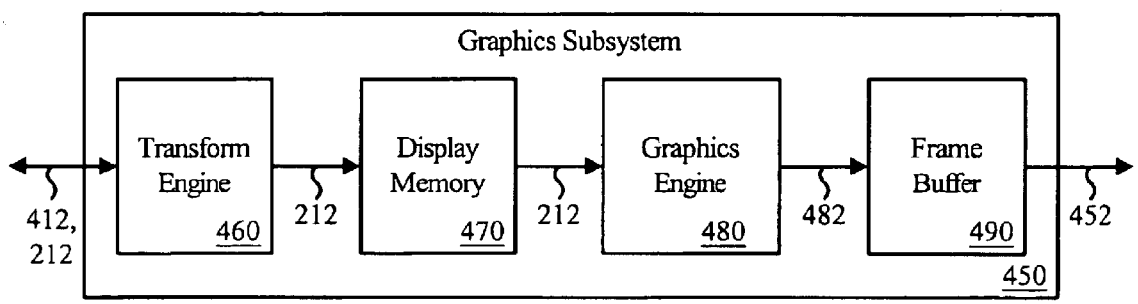
FIG. 4b is a schematic block diagram depicting one embodiment of a graphics subsystem in accordance with the present invention.

Referring to FIG. 4b, one embodiment of the graphics subsystem 450 in accordance of the present invention includes a transform engine 460, a display memory 470, a graphics engine 480, and a frame buffer 490. The transform engine 460 receives data such as the object descriptors 212 from the system bus 412. In the preferred embodiment, the transform engine 460 converts the coordinates associated with the object descriptors 212 into screen coordinates such as those seen by the perspective viewer 106. The display memory 470 stores the object descriptors 212 and provides them to the graphics engine 480.

The graphics engine 480 converts the object descriptors 212 to rendered pixels 482, while the frame buffer 490 and associated circuitry converts the rendered pixels 482 to the video signal 452. In one embodiment, the display memory 470 is substantially identical to the (prior art) display memory 210 and the frame buffer 490 is substantially identical to the (prior art) frame buffer 260.

Figure 5:
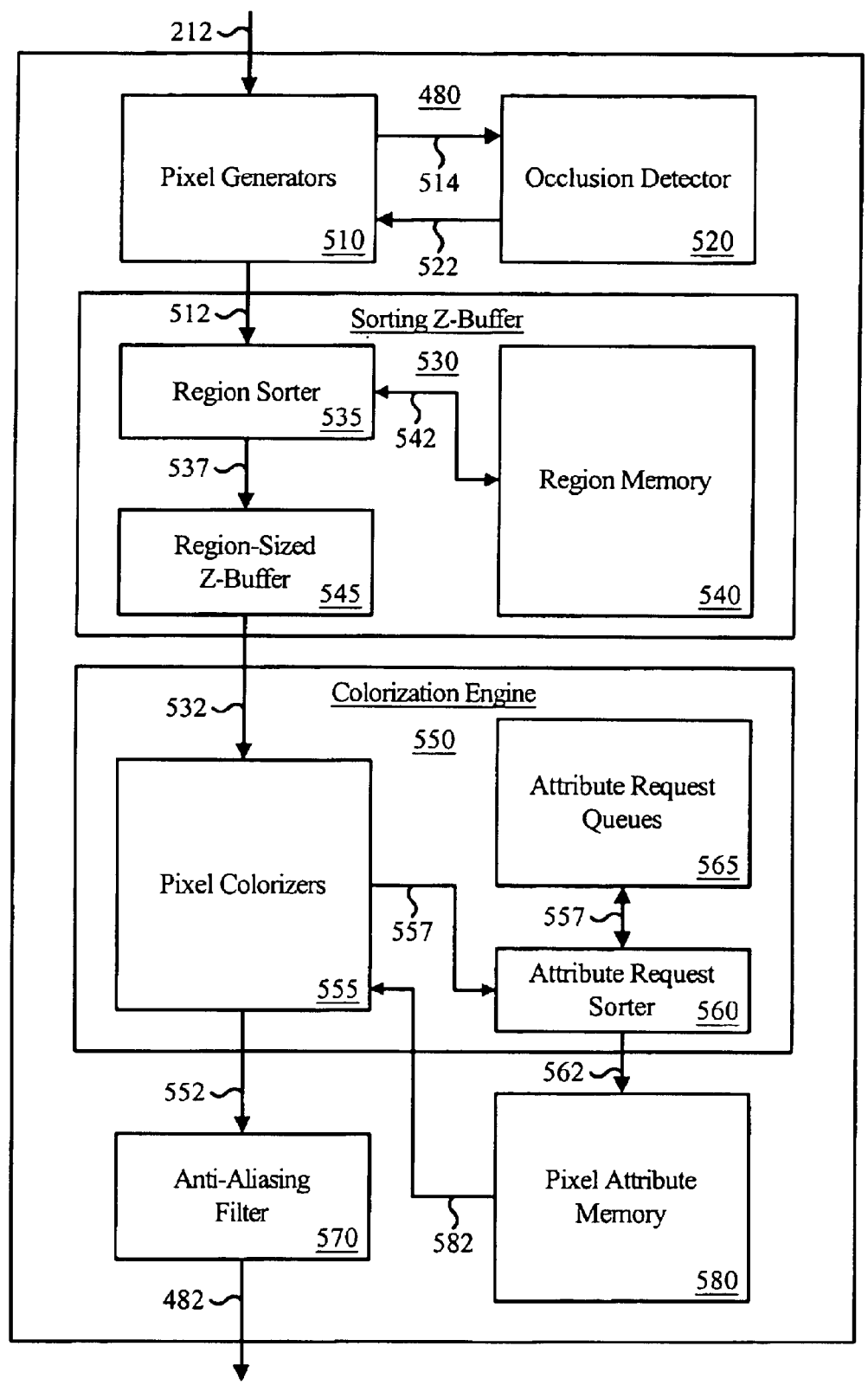
FIG. 5 is a schematic block diagram depicting one embodiment of a graphical rendering apparatus of the present invention.

FIG. 5 is a schematic block diagram depicting one embodiment of the graphics engine 480 of the present invention. The graphics engine 480 may be embodied in hardware, software or a combination of the two. In the preferred embodiment, the graphics engine 480 is pipelined, operating on batches of pixels corresponding to a single tile. For example, the sorting z-buffer may operate on objects or pixels corresponding to a first tile, while the colorizing engine works on pixels corresponding to a second tile. When the colorizing engine has finished colorizing the pixels, the pixels are sorted into screen order and antialiased, generating rendered pixels.

In the depicted embodiment, the graphics engine 480 includes a set of pixel generators 510 that operate in conjunction with one or more occlusion detectors 520 to conduct gated pixelization. The pixel generators 510 receive the object descriptors 212 and provide potentially visible pixels 512 to a sorting z-buffer 530. The occlusion detectors 520 gate the pixelization conducted by the pixel generators by maintaining a current occlusion depth for each pixel position.

As shown in FIG. 4, the object descriptors 212 may be provided by the display memory 470. The object descriptors 212 describe graphical objects, such as the graphical object 100 of FIG. 1. Each object may be composed of multiple sub-objects or primitives such as triangles, bezier patches, and voxel arrays. In the preferred embodiment, each sub-object corresponds to one object descriptor 212 resulting in multiple object descriptors 212 for those objects that are composed of multiple sub-objects.

Processing is preferably conducted on each object descriptor 212 independent of other object descriptors. For purposes of clarity, the description of this invention typically implies a single object descriptor 212 for each graphical object 100, though multiple object descriptors 212 are preferred for each graphical object 100.

The object descriptors 212 are typically stored within the display memory 470 as a collection of display lists. In the preferred embodiment, each display list corresponds to a tile. The descriptors for objects (or primitives) that overlap multiple tiles are placed in more than one display list, each list is sorted in order of depth, and the object descriptors 212 are sorted in tile and depth order. In one embodiment, display list sorting to provide tile and depth ordering is conducted by the transform engine 460. Tile and depth ordering is preferred to increase efficiency, but is not required. Collectively, the object descriptors 212 describe a graphical scene such as the graphical scene 150.

Referring again to FIG. 5, the occlusion detector 520 receives a pixel set descriptor 514, including depth information, and provides a pixel set mask 522. In one embodiment, the pixel set descriptor describes a horizontal span of consecutive pixels. The pixel set mask 522 preferably comprises one bit per pixel location within the pixel set defined by the pixel set descriptor 514. The pixel set mask 522 indicates which pixels within the pixel set are potentially visible or alternately, which pixels locations were previously rendered at a shallower depth, and therefore need not be rendered.

The pixel generators 510 coordinate with the occlusion detectors 520 to prune or gate pixels that are known to be occluded and in response provide the potentially visible pixels 512. Conducting gated pixelization, via the occlusion detectors 520, reduces the processing and storage burden on the graphics engine 480, particularly the pixel generators 510, and reduces the required size of the sorting z-buffer 530.

The sorting z-buffer 530 receives the potentially visible pixels from the pixel generators 510. The sorting z-buffer 530 sorts the potentially visible pixels into regions to facilitate using a relatively small z-buffer referred to as a region-sized z-buffer 545. The sorted pixels are processed one region at a time, by the region-sized z-buffer 545 to provide visible pixels 532. In certain embodiments, where pixel transparency is supported, multiple pixel descriptors for the same pixel location are provided to the colorization engine 550.

The colorization engine 550 colorizes the visible pixels 532 to provide colorized pixels 552. Colorizing the pixels may involve a wide variety of operations that effect the final rendered color of each pixel. In one embodiment, colorizing the pixels includes operations selected from texturing, shading, environmental reflectance mapping, and shadowing.

The colorized pixels 552 are filtered by an anti-aliasing filter 570 to provide the rendered pixels 482. The graphics engine 480 also includes a pixel attribute memory 580 containing information such as texture maps, color tables, and the like. The information within the pixel attribute memory 580 is used by the colorization engine 550 to conduct colorizing operations.

As depicted in FIG. 5, the sorting z-buffer 530 includes a region sorter 535, a region memory 540, and a region-sized z-buffer 545. The region sorter 535 receives the potentially visible pixels 512 and groups the pixels into regions based on their x,y coordinates within the graphical scene 150. In one embodiment, the region sorter 535 is a bucket sorter that uses selected high order bits of the x and y coordinates as a sorting key to sort the potentially visible pixels 512.

In the depicted embodiment, the potentially visible pixels 512 are distributed into the region memory 540 via a memory bus 542 to locations that correspond to specific regions within the graphical scene 150. In one embodiment the region memory locations are dynamically allocated to specific regions and are accessed via a linked list. The sorted pixels 537 corresponding to a region within the graphical scene 150 are removed from the region memory 540 by the region sorter 535 and are processed by the region-sized z-buffer 545 to provide the visible pixels 532.

Sorting the pixels into regions facilitates the use of a very small z-buffer. The screen regions corresponding to the region-sized z-buffer 545 are preferably smaller than, and aligned with, the tiles 310. In one embodiment, multiple pass hyper-sorting is conducted such that each region is a single pixel and the region-sized z-buffer 545 is essentially a register.

Sorting the pixels into regions also facilitates the use of larger tiles within a rendering system. Larger tiles reduce the processing load on the graphics engine 480, as a greater fraction of the primitives comprising the graphical objects 100 are contained within a single graphical tile 310. In one embodiment, the tile 310 is equivalent to the screen 300.

The region-sized z-buffer 545 preferably stores a pixel for each x, y position within a region of the graphical scene 150. A pixel is overwritten only if it has a pixel depth that is less than the depth of the currently stored pixel. After processing all of the sorted pixels 537 corresponding to a region, the pixels remaining within the region-sized z-buffer 545 are presented as the visible pixels 532.

The sorting z-buffer 545 facilitates the usage of complex pixel descriptors while using a relatively small local memory. Another benefit of the sorting z-buffer 545 is the ability to conduct deferred shading and texturing while significantly reducing external memory accesses. The sorting z-buffer 545 also minimizes the processing load on the rest of the graphics pipeline 480, particularly the colorization engine 550.

The colorization engine 550 depicted in FIG. 5 includes a set of pixel colorizers 555, an attribute request sorter 560, and a set of attribute request queues 565. The pixel colorizers 555 receive the visible pixels 532 including descriptive information used to colorize the pixels. The descriptive information is used to generate attribute requests 557 that are sent to the attribute request sorter 560.

The attribute request sorter 560 sorts and directs the attribute requests 557 to the attribute request queues 565. In one embodiment, the attribute request sorter sorts the attribute requests 557 according to the memory page in which the requested attribute is stored. The attribute request sorter 560 also directs the sorted requests to provide one or more sorted attribute requests 562 the pixel attribute memory 580. The pixel attribute memory 580 receives the sorted attribute requests 562 and provides one or more pixels attributes 582.

Sorting the attribute requests increases the effective bandwidth to external storage by increasing the locality of memory references. This facilitates the use of a larger amount of slower, lower cost memory with the same effective bandwidth as faster memory, or greater texture storage bandwidth with the same memory technology. It allows complex multiple lookup texturing and shading algorithms to be conducted efficiently by repeatedly calculating the address of the next item data to be looked up then looking them all up in batches between sorting steps.

The pixel attributes 582 are received by the pixel colorizers 555 and are used to colorize the visible pixels 532. Colorizing only visible pixels reduces the processing load on the graphics engine 480. In one embodiment, colorization comprises shading, texturing including surface normal perturbation, as well as bi-directional reflectance data lookup for shading.

The various mechanisms of the graphics engine 480 work together to accomplish high performance rendering using reduced system resources. In certain embodiments, the reduced usage of resources facilitates the super-sampling of pixels, which is preferred when rendering voxel objects. Super-sampling involves rendering at a resolution that is too detailed to be displayed by the output device, followed by filtering and down-sampling to a lower resolution image that is displayable by the output device.

For example, in one embodiment, super-sampling involves generating a 3×3 grid of super-sampled pixels for each pixel displayed. The 3×3 grid of super-sampled pixels are low-pass filtered and down-sampled by the anti-aliasing filter 570 to provide the rendered pixels 482. Super-sampling increases image quality but also significantly increases the processing and storage requirements of graphical systems.

Figure 6:
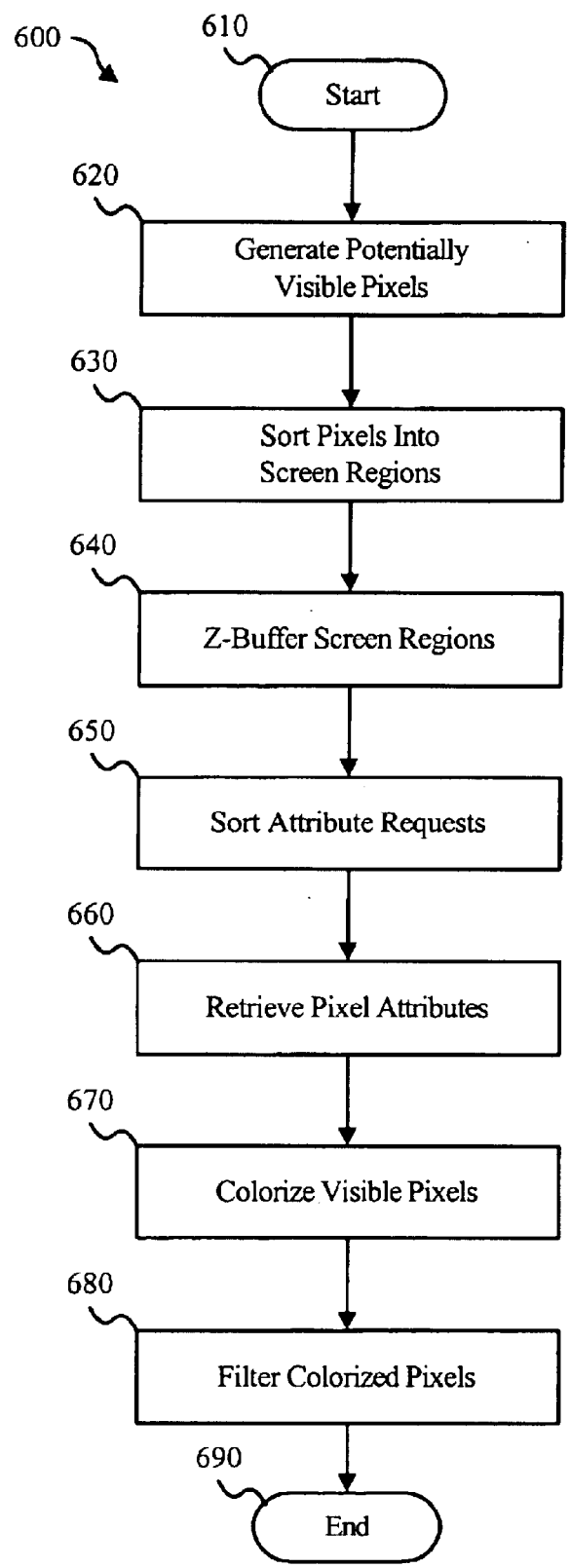
FIG. 6 is a schematic block diagram depicting one embodiment of a graphical rendering method of the present invention.

Referring to FIG. 6, one embodiment of a graphical rendering method 600 may be conducted independently of, or in conjunction with, the graphics engine 480. The graphical rendering method 600 may be conducted in hardware, software, or a combination of the two. The graphical rendering method 600 commences with a start step 610 followed by a generate step 620. The generate step 620 provides potentially visible pixels from a descriptor such as the object descriptor 212.

The graphical rendering method 600 proceeds from the generate step 620 to a sort step 630. The sort step 630 sorts pixels such as the potentially visible pixels 512 into a plurality of screen regions. In one embodiment, the sort step 630 sorts using the most significant bits of each pixel's x,y coordinates.

The sort step 630 is followed by a z-buffer region step 640. The z-buffer region step 640 may be conducted in conjunction with the region-sized z-buffer 545. The z-buffer region step 640 retains the pixel with the shallowest depth for each unique x,y coordinate in a screen region. If transparency is being used, more than one pixel per x,y coordinate may be retained and sent on to the colorizing engine. The level of transparency for each pixel is preferably known at this point. The z-buffer region step 640 is preferably repeated for each screen region referenced in the sort step 630.

After the z-buffer region step 640, the graphical rendering method 600 proceeds to a sort step 650. Attribute requests are calculated based on the memory location of the texture or other information required to determine the color of each pixel. The sort step 650 sorts multiple attribute requests to increase the locality of memory references, which maximizes the rate at which data is transferred from internal or external memory by minimizing the number of new DRAM page accesses. The sort step 650 is followed by a retrieve step 660, which retrieves the requested pixel attributes.

The retrieve step 660 is followed by a colorize step 670 and a filter step 680. The colorize step 670 uses the pixel attributes to color, texture, and shade pixels to provide colorized pixels. The filter step 680 removes aliasing effects by filtering the colorized pixels. The graphical rendering method 600 terminates at an end step 690.

As mentioned, the graphical rendering method 600 may be conducted in conjunction with the graphics engine 480. Specifically, the generate step 620 is preferably conducted by the pixel generators 510 and the occlusion detectors 520. The sort step 630 and the z-buffer region step 640 are preferably conducted in conjunction with the sorting z-buffer 530. The sort step 650, the retrieve step 660 and the colorize step 670 are in one embodiment conducted in conjunction with the colorization engine 550 and the pixel attribute memory 580. Lastly, the filter step 680 is preferably conducted in conjunction with the anti-aliasing filter 570.

Figure 7:
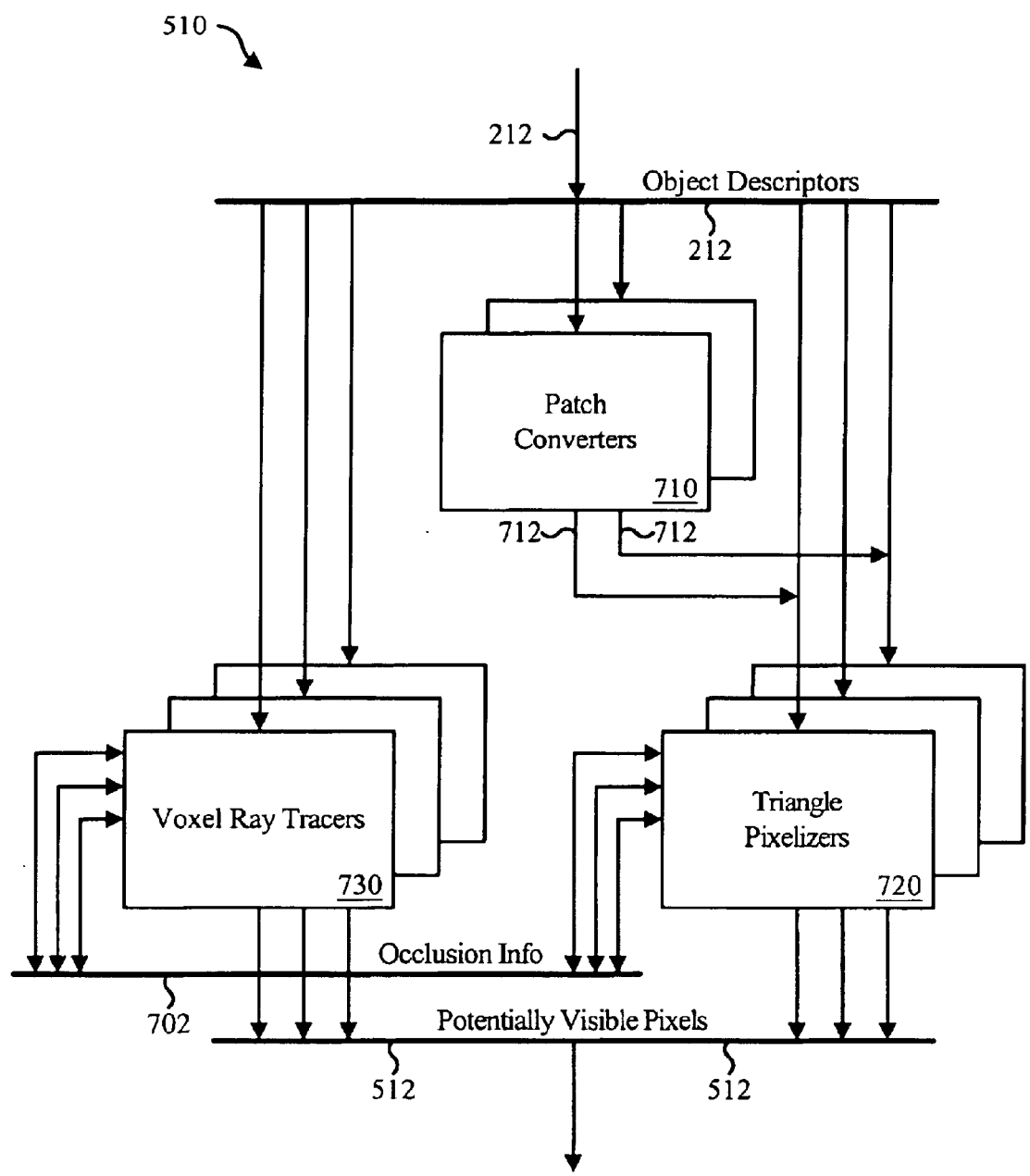
FIG. 7 is a schematic block diagram depicting one embodiment of a pixel generation apparatus of the present invention.

FIG. 7 is a schematic block diagram depicting one embodiment of the pixel generators 510 of FIG. 5. As depicted, the pixel generators 510 include a plurality of patch tessilators 710, triangle pixelizers 720, and voxel ray tracers 730. The pixel generators 510 receive the object descriptors 212, and coordinate with the occlusion detectors 520 via an occlusion bus 702, to generate the potentially visible pixels 512.

In one embodiment, the object descriptors 212 received by the patch tessilator 710 describe surface patches such as bezier patches. The patch tessilator 710 converts the surface patches into triangle descriptors 712. The triangle pixelizers 720 receive the triangle descriptors 712 from the patch tessilator 710 or the object descriptors 212 that describe triangles from a module such as the display memory 210. The triangle pixelizers 720 in turn provide the potentially visible pixels 512.

The voxel ray tracers 730 receive the object descriptors 212 that describe or reference voxel objects. Voxel objects are essentially three-dimensional bitmaps that may include surface normal information for each voxel. The voxel ray tracers 730 conduct ray tracing operations that sample voxel objects to provide the potentially visible pixels 512.

The patch tessilators 710 and the triangle pixelizers 720 are exemplary of the architecture of the pixel generators 510. Pixelizers such as the triangle pixelizers 720 receive primitive objects and convert the objects to pixels. The voxel ray tracer 730 is also a pixelizer in that voxels are primitive objects, and the voxel ray tracer 730 provides potentially visible pixels 512. In contrast to pixelizers, converters such as the patch tessilators 710 receive non-primitive objects and convert them to primitive objects that are then processed by pixelizers. Other types of converters and pixelizers may be used within the pixel generators 510.

Table 1 depicts one embodiment of a pixel descriptor used in conjunction with certain embodiments of the present invention. The pixel descriptor may be dependent on the particular type of graphical object 100 that is being processed. For instance, pixel descriptors containing data corresponding to patch objects may differ in structure from pixel descriptors containing data corresponding to voxel objects.

In certain embodiments, the various elements of the graphics engine 480 and the graphical rendering method 600 reference or provide information to the pixel descriptor. For example, in the preferred embodiment, the pixel generators 510 may provide the X,Y location of the pixel within the tile, the Z depth value, the I.D. of the object that generated it, the U,V texture coordinates, and the nX,nY,nZ surface normal values, while the pixel colorizers 555 provide the R, G, and B values. Pixels generated from voxel objects may not utilize all of the fields, such as the surface normal information that may be looked up after the z-buffering stage. The pixel descriptor is preferably dynamic in that fields are added or deleted as required by the stage of the pipeline working with it.

TABLE 1

| Pixel Descriptor | | | | | |
|---|---|---|---|---|---|
| R, G, B | Color Index | X, Y, Z | U, V | nX, nY, nZ | Object ID |

In one embodiment, the pixel descriptor is used to represent the potentially visible pixels 512, the visible pixels 532, and colorized pixels 552. Using a pixel descriptor facilitates a decentralized architecture for the graphics engine 480, such as the flow-thru architecture described in conjunction with FIG. 5. The pixel descriptor shown in Table 1 includes values for the device component colors such as the Red, Green, and Blue color values shown in conjunction with the rendered color 108 depicted in FIG. 1a. Also included are a color index for the object color, the X, Y, and Z coordinates for the particular pixel, a pair of texture map coordinates U, V, and surface normal information nX, nY, and nZ.

Figure 8A:
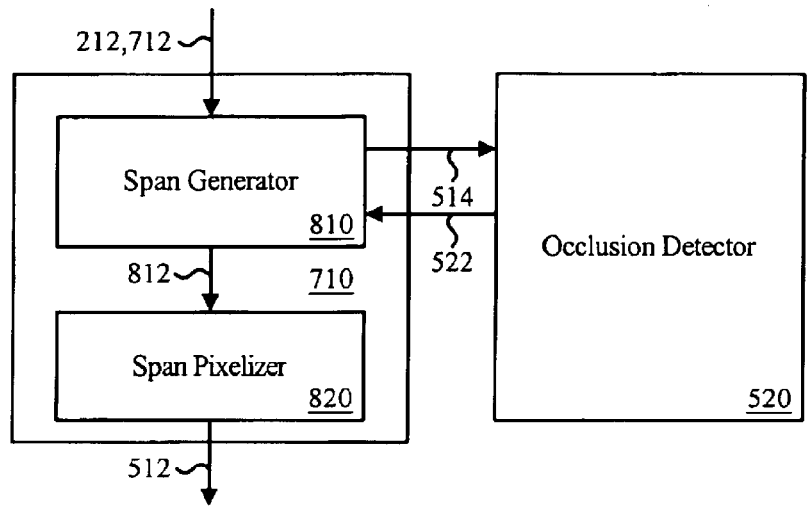
FIG. 8a is a schematic block diagram depicting one embodiment of a triangle pixelization apparatus of the present invention.

Referring to FIG. 8a, one embodiment of the triangle pixelizer 720 includes a span generator 810 and a span converter 820. The span generator 810 receives the triangle descriptors 712 or the object descriptors 212 that describe triangles and provides a set of spans 812 that are enclosed by the described triangles. In certain situations, the span generator 810 may not generate any of the spans 812. For example, a triangle on its edge may be too thin, and some triangles may be too small to enclose any spans 812.

In the depicted embodiment, the span generator 810 provides a pixel set descriptor 514 to the occlusion detector 520. In return, the occlusion detector 520 provides the pixel set mask 522 indicating which pixels within the pixel set are potentially visible. In one embodiment, the span generator 810 ensures, via the occlusion detector 520, that the spans 812 are pixel spans in which no pixels are known to be occluded. If not, the span generator 810 may restrict or subdivide the spans 812, such that no pixels therein are known to be occluded. The span converter 820 receives the spans 812 and converts the spans into individual pixels, i.e., the potentially visible pixels 512.

Figure 8B:
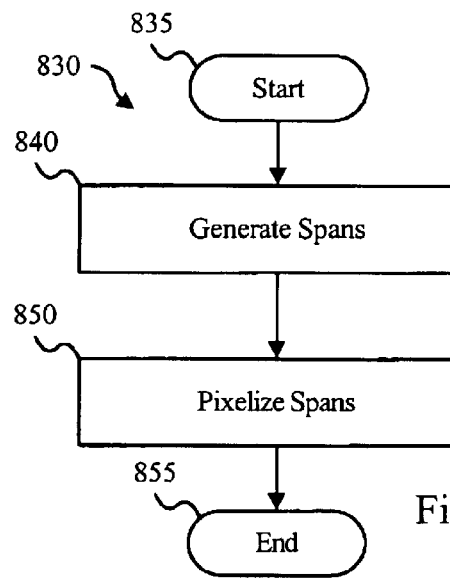
FIG. 8b is a flow chart diagram depicting one embodiment of a triangle pixelization method of the present invention.

FIG. 8b is a flow chart diagram depicting one embodiment of a triangle pixelization method 830 of the present invention. The triangle pixelization method 830 includes a start step 835, a generate spans step 840, a pixelize spans step 850, and an end step 855. The generate spans step 840 converts the object descriptor 212 into the spans 812. In one embodiment, the spans 812 containing pixels that are known to be occluded may be subdivided into spans 812 in which no pixels are known to be occluded.

The pixelize spans step 850 converts the spans 812 into individual pixels to provide the potentially visible pixels 512. The triangle pixelization method 830 may be appropriate for objects other than triangles. The triangle pixelization method 830 may be conducted independently of, or in conjunction with, the triangle pixelizer 720.

Figure 8C:
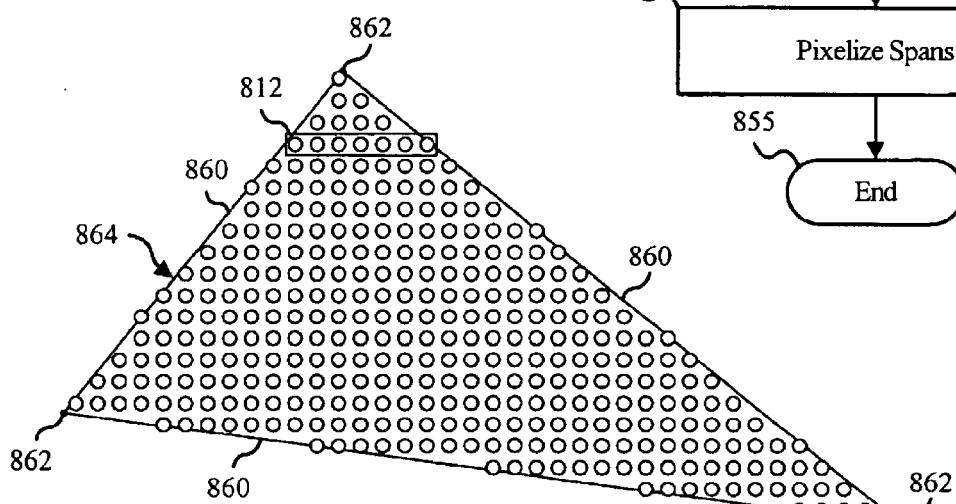
FIG. 8c is an illustration depicting the results of one embodiment of the triangle pixelization method of the present invention.

FIG. 8c depicts the results typical of the triangle pixelization method 830. An object boundary 860 is defined by connecting a set of object vertices 862. The object boundary 860 encompasses a set of pixels 864 that are within the object boundary. The generate spans step 840 converts the object descriptor 212 into the spans 812. For example, spans may be computed using geometric formulas that calculate the minimum and maximum x values for each pixel scanline using slope information. The minimum and maximum x values correspond to a start pixel and an end pixel of the span 812.

Figure 9:
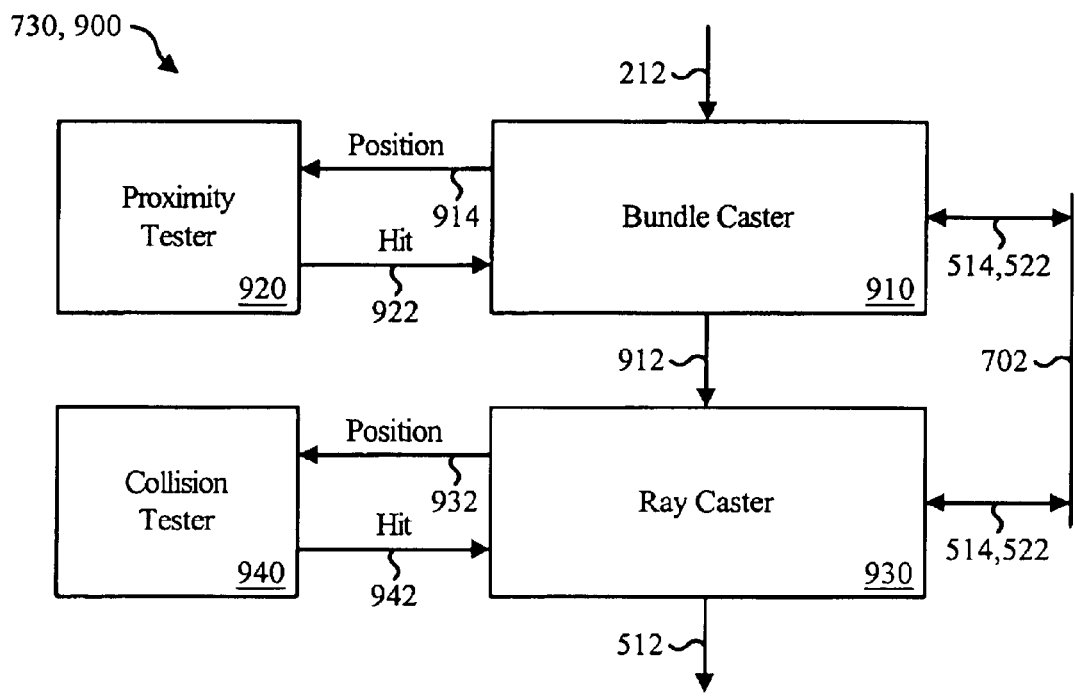
FIG. 9 is a schematic block diagram depicting one embodiment of a ray tracing apparatus of the present invention.

Referring now to FIG. 9, one embodiment of a ray tracing apparatus 900 includes a bundle caster 910, a proximity tester 920, a ray caster 930, and a collision tester 940. The ray tracing apparatus 900 may be used to embody the voxel ray tracers 730 of FIG. 7. The bundle caster 910 receives the object descriptor 212 and provides one or more proximate rays 912. The ray caster 930 receives the proximate rays 912 and provides the potentially visible pixels 512.

The bundle caster 910 recursively advances a position 914 of a ray bundle. The proximity tester 920 receives the position 914 and returns a hit signal 922 if the position 914 is proximate to an object of interest or a portion thereof, such as individual voxels. In one embodiment, the object of interest is a voxel object, the position 914 advances a distance that corresponds to a proximity distance used by the proximity tester 920, and the recursive advancement of the position 914 terminates upon assertion of the hit signal 922. The ray bundle that is advanced by the bundle caster corresponds to a screen area or region within the graphical scene 150.

In the depicted embodiment, the bundle caster provides an individual ray 912 to the ray caster 930. The ray caster 930 recursively advances a position 932 of an individual ray. The collision tester 940 receives the position 932 and returns a hit signal 942 if the position 932 impinges upon an object of interest. In one embodiment, the object of interest is a voxel object, and the recursive advancement of the position 932 terminates upon assertion of the hit signal 942.

In the depicted embodiment, the bundle caster 910 and the ray caster 930 communicate with the occlusion detector 520 via the occlusion bus 702 which in one embodiment carries the pixel set descriptor 514 and the pixel set mask 522. The position 914 that is advanced by the bundle caster 910 and the position 932 that is advanced by the ray caster 930 each have a depth component that corresponds to a pixel depth within the graphical scene 150.

The bundle caster 910 and the ray caster 930 provide information to one or more occlusion detectors sufficient to ascertain which rays have a pixel depth greater than the current occlusion depth. The pixels that are potentially visible are provided by the ray caster 930 as the potentially visible pixels 512.

In one embodiment, the ray caster 930 informs the occlusion detector 520 via the occlusion bus 702 regarding the depth at which occlusion occurs, i.e., the depth at which an object of interest is impinged. In the preferred embodiment, the occlusion detector 520 uses the depth information to ascertain the occluded pixels and to update the current occlusion depth for each pixel position within the pixel set.

Figure 10A:
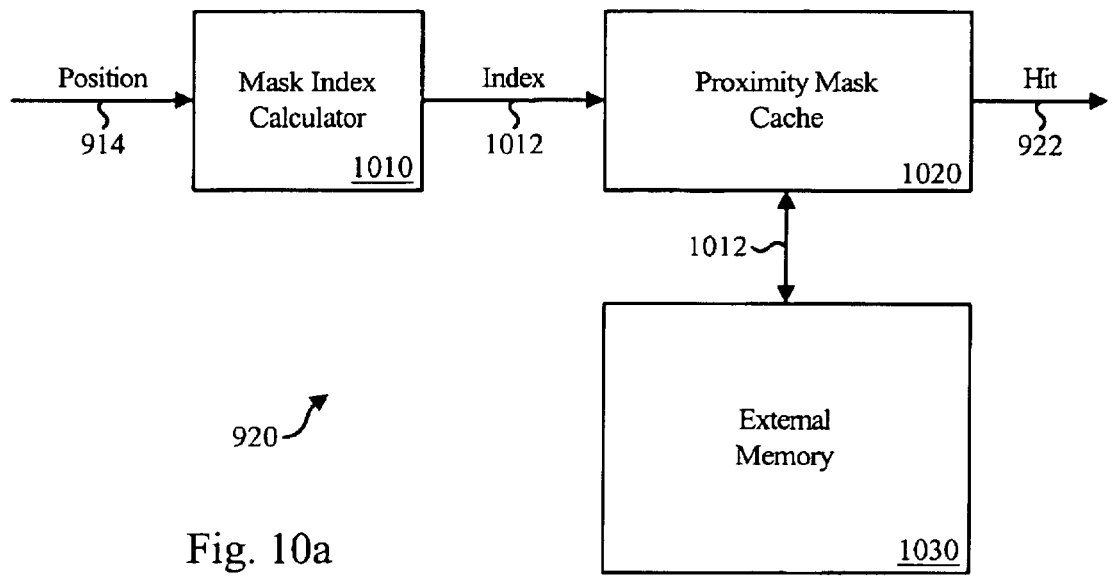
FIG. 10a is a schematic block diagram depicting one embodiment of a proximity testing apparatus of the present invention.

Referring to FIG. 10a, one embodiment of the proximity tester 920 includes a mask index calculator 1010, a proximity mask cache 1020, and an external memory 1030. The caching architecture of the proximity tester 920 reduces the required size of local storage such as on-chip memory. The caching architecture also allows facilitates the use of slower non-local memory, such as off-chip memory, and lowers the access bandwidth required of the non-local memory since only the data likely to be used need be brought on-chip.

The mask index calculator 1010 receives the position 914 and computes an index 1012 corresponding to the position 914. The proximity mask cache 1020 contains bit fields indicating the positions that are proximate or within an object of interest. The indexed mask bit is preferably within the proximity mask cache 1020 and is used to provide the hit signal 922. If the mask bit corresponding to the index 1012 is not within the proximity mask cache 1020, the proper mask bit is retrieved via the external memory 1030.

Figure 10B:
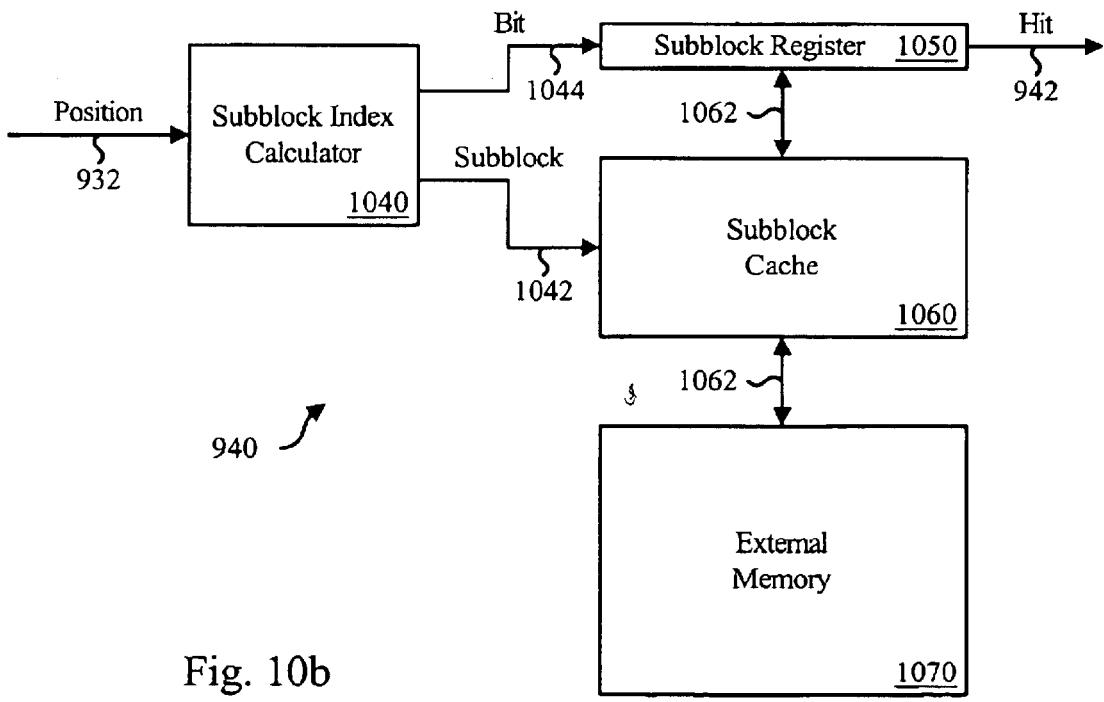
FIG. 10b is a schematic block diagram depicting one embodiment of a collision testing apparatus of the present invention.

Referring to FIG. 10b, one embodiment of a collision tester 940 includes a subblock index calculator 1040, a subblock register 1050, a subblock cache 1060, and an external memory 1070. The collision tester 940 partitions collision bits indicating the positions in rendering space that an object of interest occupies into three-dimensional subblocks such as a 4×4×4 grid of collision bits.

To increase the hit rate within the subblock cache 1060 and to facilitate efficient memory transfers, the various functional units of the collision tester 940 operate on a subblock basis using a subblock 1062. The use of subblocks and a subblock cache within the collision tester 940 facilitates the use of slower non-local memory, such as off-chip memory, and lowers the access bandwidth required of the non-local memory. Subblocks also reduce the required size of local storage such as on-chip memory. In the preferred embodiment, the use of subblocks and the subblock cache 1060 within the collision tester 940 allows the mask tests to be conducted very quickly since the subblock in use is stored locally to the ray caster.

The subblock index calculator 1040 receives the position 932 and computes a subblock index 1042 as well as a bit index 1044. The subblock index 1042 is received by and used to access the subblock cache 1060. If the referenced subblock 1062 is within the cache, it is provided to the subblock register 1050. If not, the referenced subblock 1062 is retrieved from the external memory 1070 and is provided to the subblock register 1050. The bit index 1044 is used to address specific collision bits within the subblock register 1050 and to provide the hit signal 942.

Figure 11:
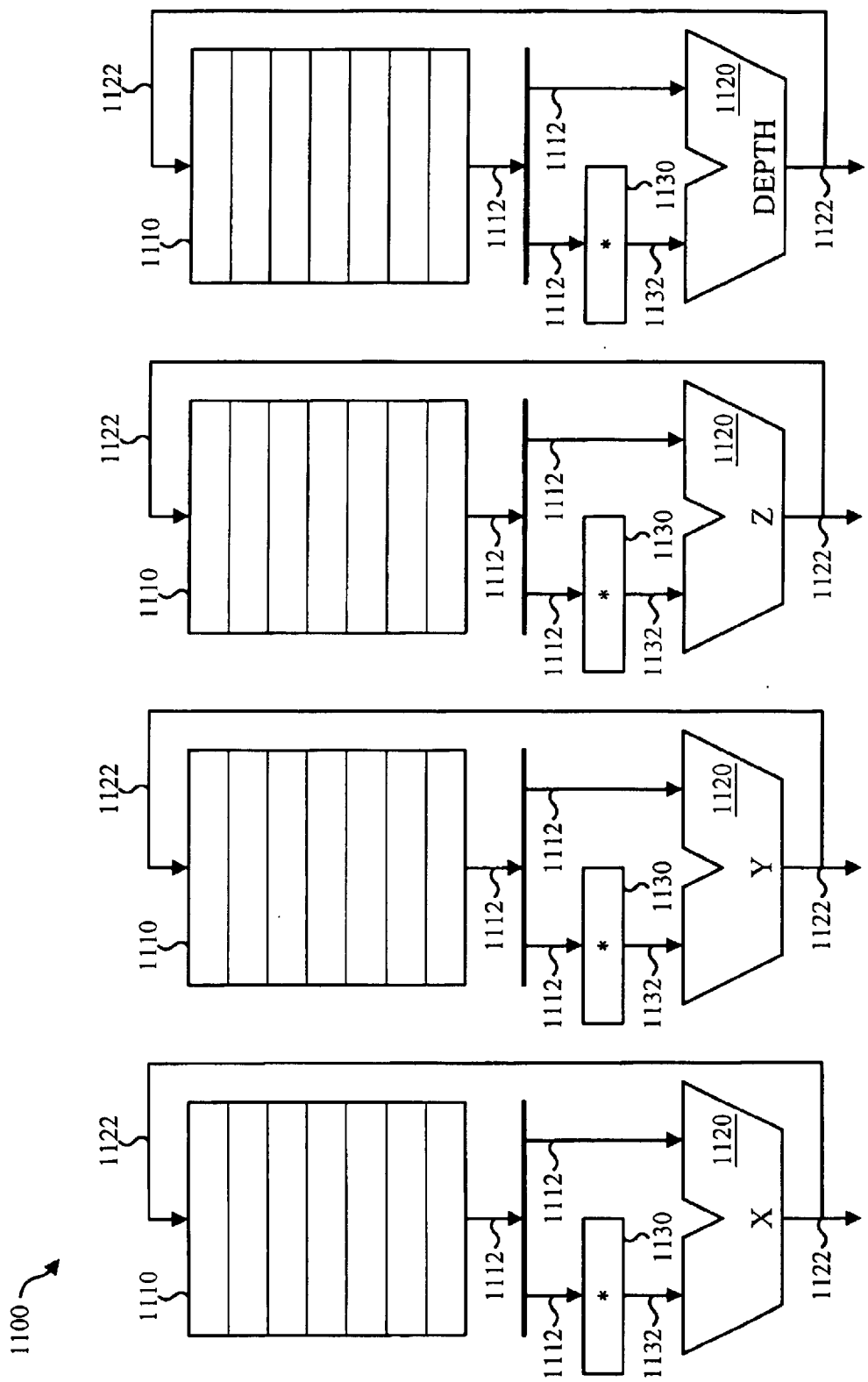
FIG. 11 is a schematic block diagram depicting one embodiment of a casting apparatus of the present invention.

Referring to FIG. 11, one embodiment of a caster 1100 includes a set of register files 1110 and a set of ALU's 1120 to compute the x, y, z, and depth coordinates of a ray or ray bundle. The caster 1100 may be used to embody the bundle caster 910 and/or the ray caster 930. The architecture of the caster 1100 facilitates using a wide variety of algorithms when conducting casting. The caster 1100 is particularly well suited to conducting vector-based casting algorithms.

The register files 1110 contain variables used in casting such as position, casting distance, vectors in the view direction, sideways vectors in the down and right direction, and the like. A register bus 1112 provides the contents of the registers within the register file 1110 to a scalar multiplier 1140 and one port of the ALU 1120. The ALU 1120 conducts standard arithmetic functions such as addition and multiplication and provides the results to a results bus 1122.

The scalar multiplier 1130 receives the contents of the register bus 1112 and provides a scaled result 1132 to the other port of the ALU 1120. The scalar multiplier may be used to reference individual rays or subbundles within a ray bundle, to translate or side-step their positions by multiplying a ray offset by a scalar value, and to add the result to a ray position. In one embodiment, the caster 1100 is a ray caster requiring no ray translation and the scalar multiplier 1130 is simply a pass-through register.

Figure 12:
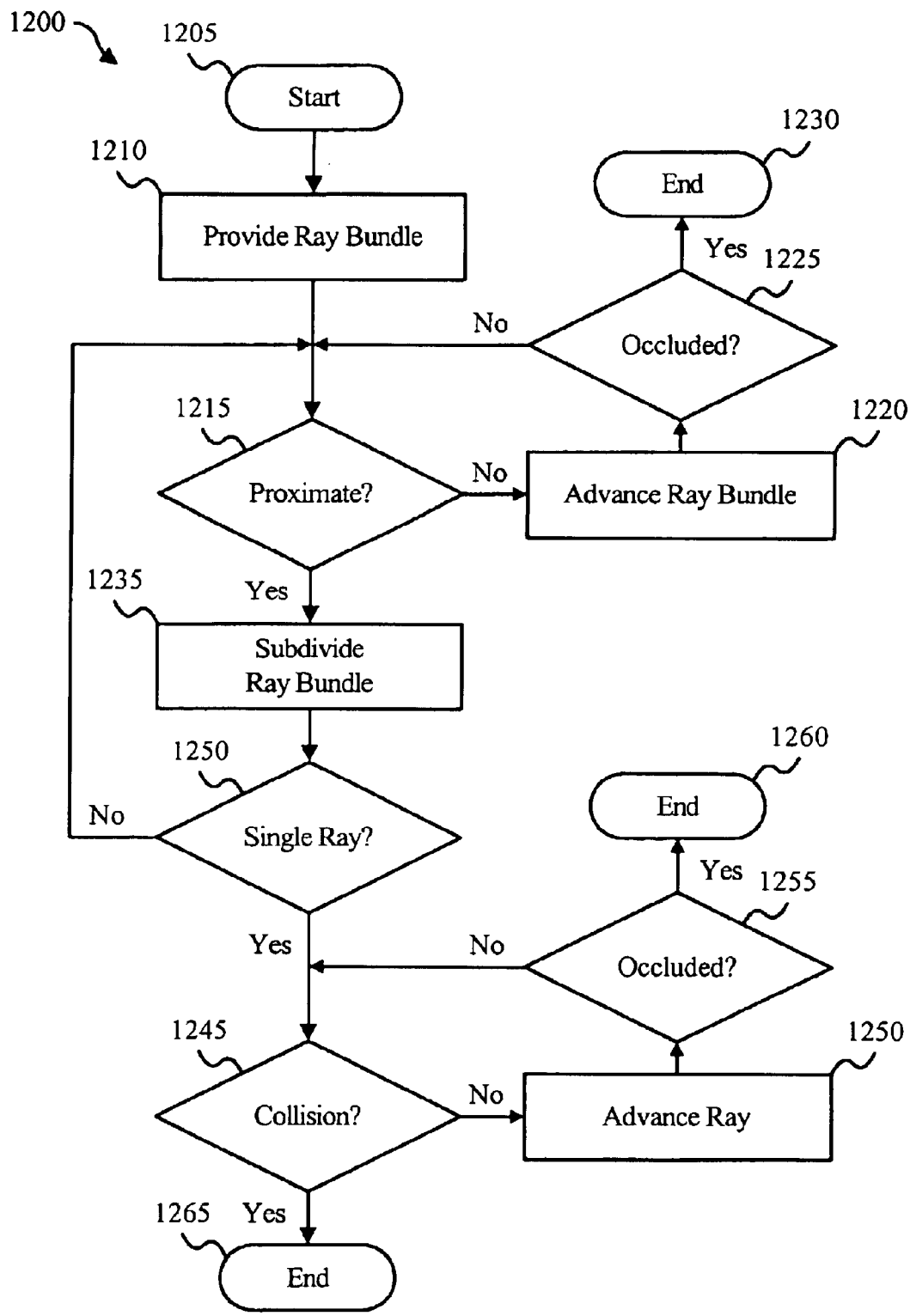
FIG. 12 is a schematic block diagram depicting one embodiment of a ray casting method of the present invention.

Referring to FIG. 12, one embodiment of a ray casting method 1200 of the present invention encompasses both bundle casting and individual ray casting. The ray casting method 1200 may be conducted in conjunction with or independent of the bundle caster 910, the ray caster 930, and the caster 1110. The ray casting method 1200 commences with a start step 1205 followed by a provide step 1210. The provide step 1210 provides a ray bundle, which in one embodiment requires initializing a position vector at the focal point 114 in a direction determined by the perspective viewer 106.

The ray casting method 1200 proceeds from the provide step 1210 to a proximity test 1215. The proximity test 1215 ascertains whether the ray bundle is proximate to an object of interest. In one embodiment, the proximity test comprises accessing a mask array in conjunction with the proximity tester 920 shown in FIG. 10a and referenced in FIG. 9. In another embodiment, the proximity test comprises accessing a distance array or grid that indicates the shortest distance from each x,y,z position to the graphical object 100.

If the proximity test 1215 is false, the ray casting method 1200 proceeds to an advance bundle step 1220. The advance bundle step 1220 adds a first casting distance to the ray bundle position. In certain embodiments, the advance bundle step 1220 is followed by an occlusion test 1225, which in one embodiment is conducted by the occlusion detector 520.

The occlusion test 1225 ascertains whether the entire ray bundle is known to be occluded (by other objects.) If so, the ray casting method 1200 terminates at an end step 1230. Otherwise, the method loops to the proximity test 1215. In certain embodiments, for instance when an apparatus has ample casting resources and scarce occlusion testing resources, the occlusion test 1225 is not conducted with every casting loop of the ray casting method 1200.

If the proximity test 1215 is true, the ray casting method 1200 proceeds to a subdivide step 1235. The subdivide step 1235 divides the ray bundle into subbundles and continues by processing each sub-bundle. Subdividing requires computing and adding a horizontal and vertical offset (i.e. adding a subbundle offset) to the position of the bundle that is subdivided. Subdividing also requires computing a new directional vector in those instances involving perspective rendering. In the preferred embodiment, computing and adding the horizontal and vertical offset is conducted in conjunction with the scalar multiplier 1130 and the ALU 1120.

In certain embodiments, the subdivide step 1235 retreats or advances the ray bundle a second casting distance to ensure proper proximity testing, facilitate longer casting distances and reduce the average number of proximity tests. In one embodiment, the subdivide step retreats a second casting distance, and the average number of proximity and collision tests per ray intersection on typical data was found to be less than eight.

In one embodiment, the subdivide step 1235 comprises activating subdivided or child bundles while continuing to conduct casting of the current (parent) bundle. Continuing to conduct casting requires proceeding to the advance bundle step 1220 even when the proximity test 1215 is true. Continued casting of the parent bundle is useful when some rays may not collide with the object(s) whose proximity is being tested. Continued casting facilitates termination of the child bundles (i.e. rebundling of the children into the parent) when the proximity test 1215 is once again false, thus reducing the required number of proximity tests.

The subdivide step 1235 is followed by the single ray test 1240, which ascertains whether the subdivided bundle contains a single ray. If not, the ray casting method 1200 loops to the proximity test 1215. Otherwise, the method 1200 proceeds to a collision test 1245. The collision test 1245 ascertains whether the individual ray has collided with an object of interest such as the graphical object 100. In one embodiment, the collision test comprises accessing a mask array in conjunction with the collision tester 940 shown in FIG. 10a and referenced in FIG. 9. If the collision test 1245 is false, the ray casting method 1200 proceeds to an advance ray step 1250.

In one embodiment, the advance ray step 1250 adds a first casting distance to the individual ray position. In another embodiment, the advance ray step 1250 computes the distance to the next intersected voxel of a voxel object, and advances that distance. In certain embodiments, the advance bundle step 1220 is followed by an occlusion test 1255, which in one embodiment is conducted by the occlusion detector 520. In certain embodiments, the occlusion test 1255 is preferably conducted in conjunction with the subdivide step 1235.

The occlusion test 1255 ascertains whether the individual ray is known to be occluded (by other objects.) If so, the ray casting method 1200 terminates at an end step 1260, otherwise the method 1200 loops to the collision test 1245. In certain embodiments, the occlusion test 1255 is not conducted for every loop of the advance ray step 1250.

The best placement and frequency of conducting the occlusion test 1225 and 1255 within the ray casting method 1200 may be application-dependent. In particular, the frequency of testing may be adjusted in response to resource availability such as processing cycles within the occlusion detector 520. In certain embodiments, the occlusion test 1225 and 1255 are preferably conducted in conjunction with the provide step 1210 and the subdivide step 1235 rather than after the advance bundle step 1220 and the advance ray step 1250.

FIG. 13a is a flow chart diagram depicting one embodiment of a proximity mask generation method 1300 in accordance with the present invention. The generated proximity mask and associated collision mask are preferably used in conjunction with the ray casting method 1200. FIGS. 13b through 13g are a series of two-dimensional illustrations depicting examples of the results of the proximity mask generation method 1300. The illustrations are presented to enable one of ordinary skill in the art to make and use the invention.

The graphical object 100 shown in FIG. 13b may be a voxel object comprised of three-dimensional cubes or voxels. For simplicity, a profile view was selected to restrict the illustration to two dimensions. A voxel object is essentially a three-dimensional bitmap wherein each cell or cube is assigned a color or texture along with a surface normal to indicate the directionality of the surface.

After starting 1310, the proximity mask generation method 1300 proceeds by converting 1320 the graphical object 100 to a collision mask 1322 at the highest resolution available. Converting a voxel object to a collision mask involves storing a single bit for each voxel or cell, preferably in a compressed format.

After creating the collision mask 1322, the proximity mask generation method 1300 proceeds by horizontal copying 1330 the collision mask 1322 in each horizontal direction to create a horizontally expanded mask 1332 shown in FIG. 13d. The horizontal copying 1330 is followed by vertically copying 1340 the horizontally expanded mask 1332 in each vertical direction to create a vertically expanded mask 1342 shown in FIG. 13e. In one embodiment, horizontal and vertical copying involves a shift operation followed by a bitwise OR operation.

The result of horizontal and vertical expansion is the proximity mask 1344 shown in FIG. 13f. In the depicted illustrations, the amount of horizontal and vertical expansion is two voxels and the proximity mask 1344 indicates a proximity of two voxels. After horizontal and vertical expansion, the proximity mask generation method 1300 optionally, and preferably, continues by reducing 1350 the resolution of the proximity mask 1344 to produce a lower resolution proximity mask 1352 shown in FIG. 13g. In the depicted embodiment, reducing 1350 comprises ORing proximity mask data from 2×2×2 grids of adjacent cells into the larger (lower resolution) cells of the lower resolution proximity mask 1352. The proximity mask generation method 1300 then terminates 1360.

Figure 14:
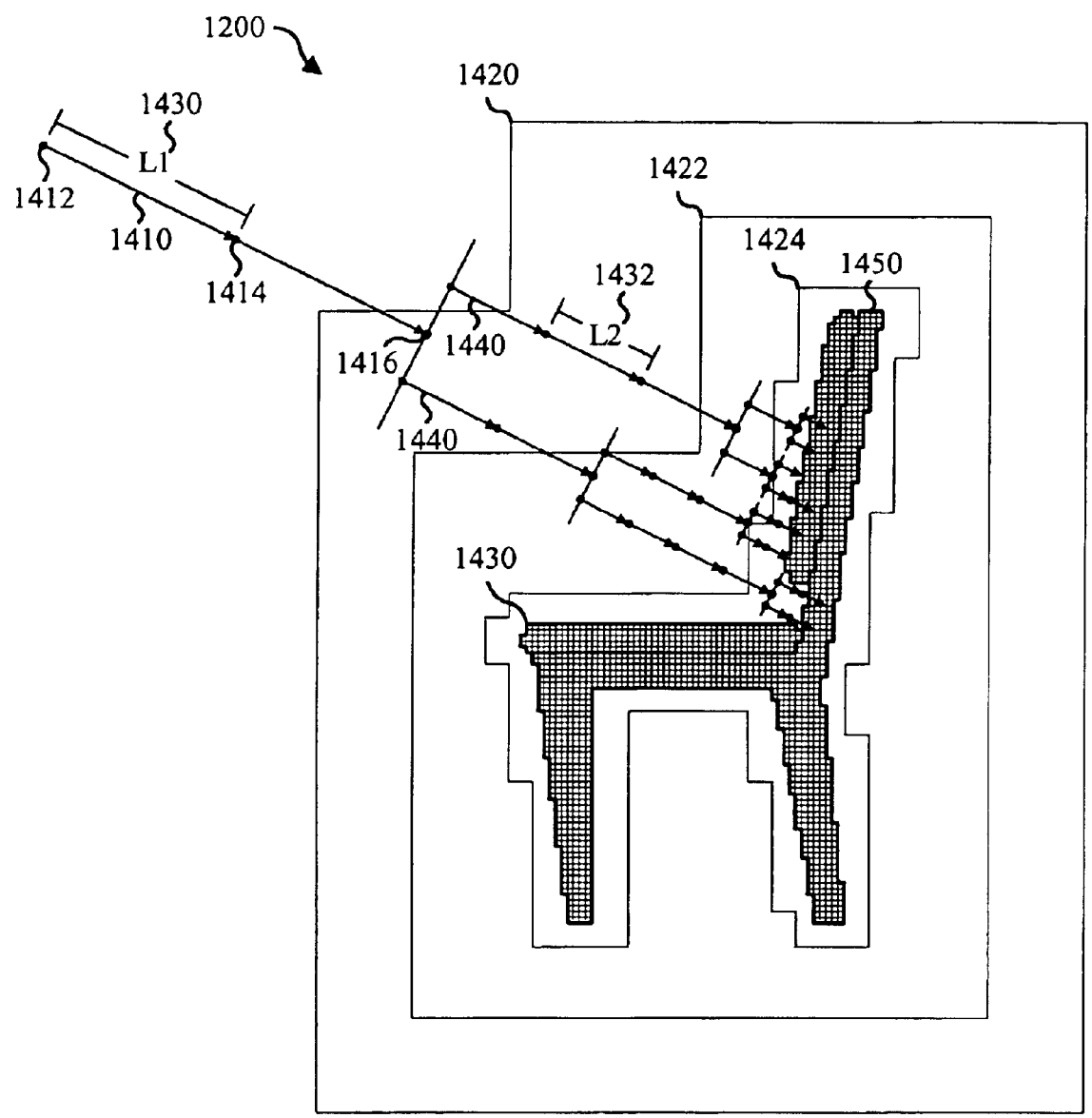
FIGS. 14, 15, and 16 are illustrations depicting the operation of various embodiments of the ray casting method of FIG. 12.

FIG. 14 is an illustration depicting the operation of one embodiment of the ray casting method 1200 in conjunction with several proximity masks and a collision mask. The illustration of FIG. 14 is intended to be a non-rigorous depiction sufficient to communicate the intent of the invention. In the depicted operation, the object of interest is a chair.

During the advancement of the ray bundles and individual rays, occlusion tests may be conducted to ascertain whether the object of interest is occluded by other graphical objects at the current position of the ray bundle or individual ray. A parent bundle 1410 with an initial position 1412 is tested against a first proximity mask 1420. The proximity test is false resulting in the parent bundle 1410 being cast a first casting distance 1430. The first casting distance 1430 preferably corresponds with the resolution of the first proximity mask 1420 such that visible objects will not be skipped.

In the depicted operation, the parent bundle 1410 advances to a second position 1414, whereupon another proximity test is conducted. The proximity test at the second position 1414 yields a false result, causing the parent bundle 1410 to advance to a third position 1416. As depicted, the proximity test at the third position 1416 is true, resulting in sub-dividing of the parent bundle 1410 into child bundles 1440.

In the depicted operation, the process of testing and subdividing is repeated for a second proximity mask 1422 using a second casting distance 1432, a third proximity mask 1424 using a third casting distance, and so forth, until the bundles are subdivided into individual rays. The individual rays are then tested against a collision mask 1450 where a true result indicates impingement upon a potentially visible object. During the advancement of the ray bundles and individual rays, occlusion tests may be conducted to ascertain whether the object of interest is occluded by other graphical objects at the current position of the ray bundle or individual ray.

Figure 15:
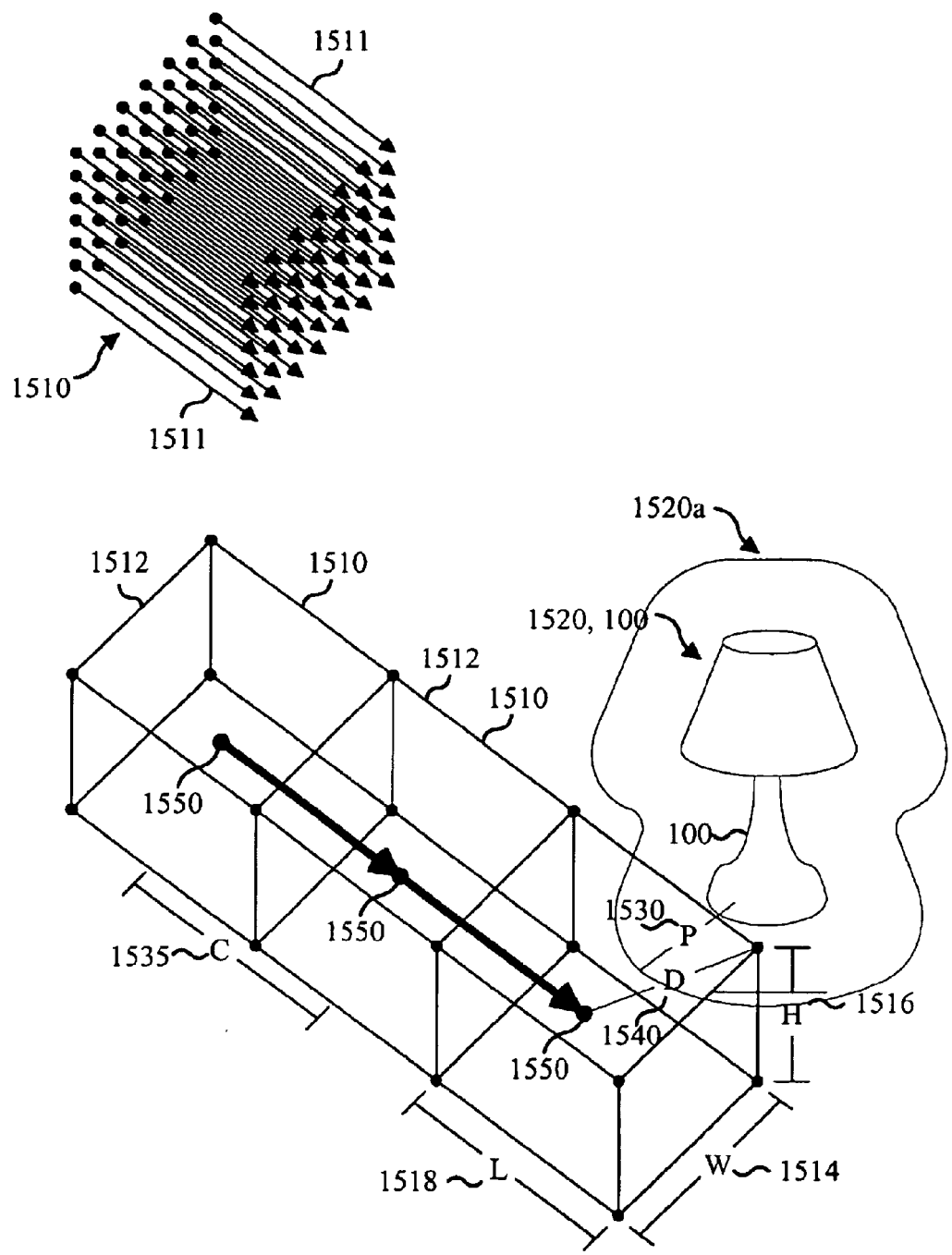
Figure 16:
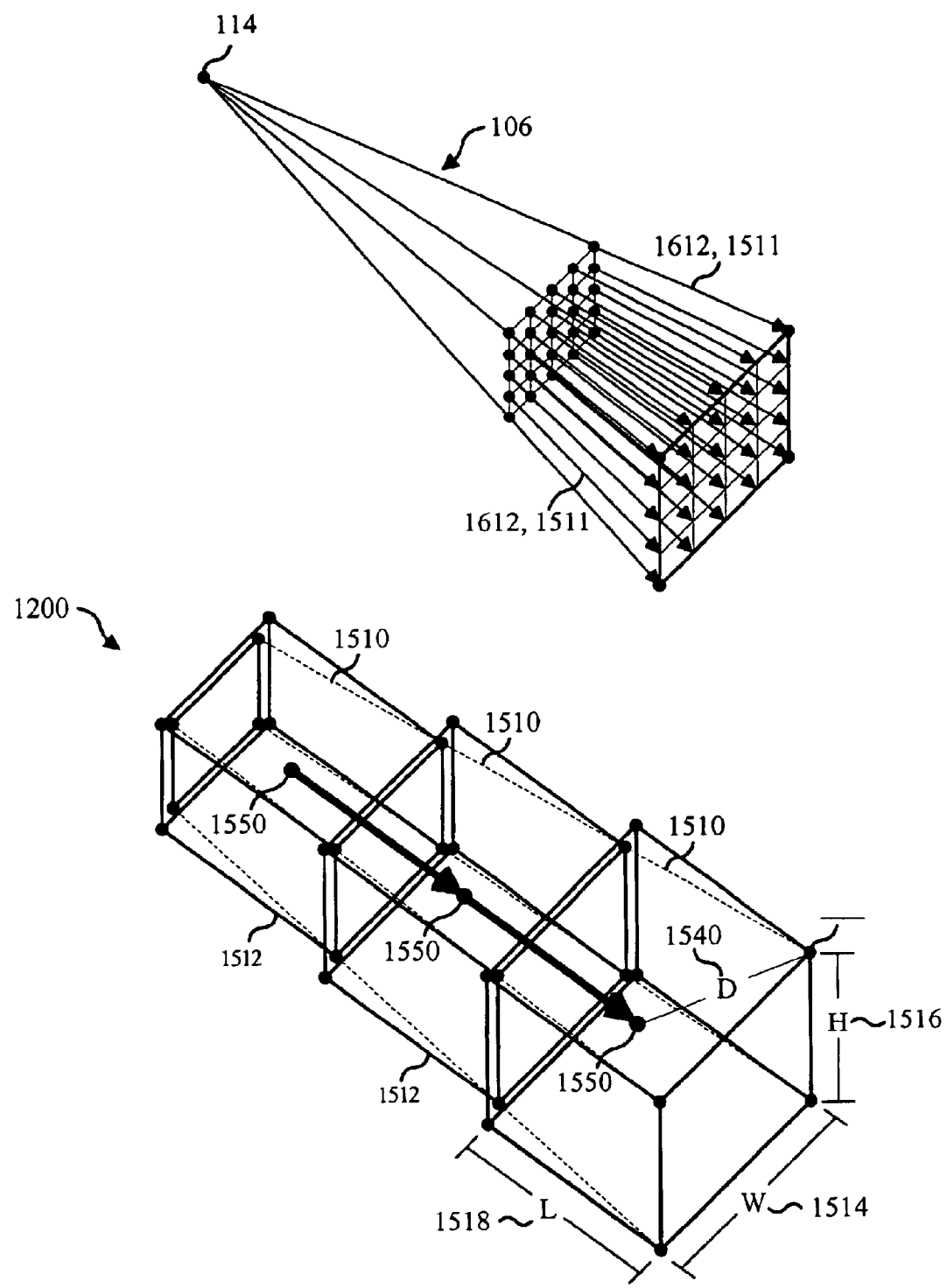

FIGS. 15, and 16 are illustrations depicting the operation of the ray casting method 1200 of the present invention. Referring to FIG. 15a, a ray bundle 1510 comprises individual rays 1511 and occupies a volume 1512 in rendering space. In the depicted embodiment, the volume 1512 is a cube with a width 1514, a height 1516, and a length 1518. An object of interest 1520 is subject to proximity tests of various distances. Successful casting requires choosing a selected proximity 1530, which ensures that the object of interest 1520 is not skipped when within the graphical scene 150, and that a casting distance 1535 is not unnecessarily short. In one embodiment, the selected proximity 1530 corresponds to an enlarged object of interest 1520a.

Proper proximity testing requires that the selected proximity 1530, i.e., the amount of enlargement used in creating a proximity mask, is greater than a distance 1540 from a testing position 1550 to the furthest point within the volume 1512. The selected proximity 1530 must therefore be greater than or equal to the distance 1540, and the testing position 1550 is preferably in the center of the volume 1512.

Figure 1A:
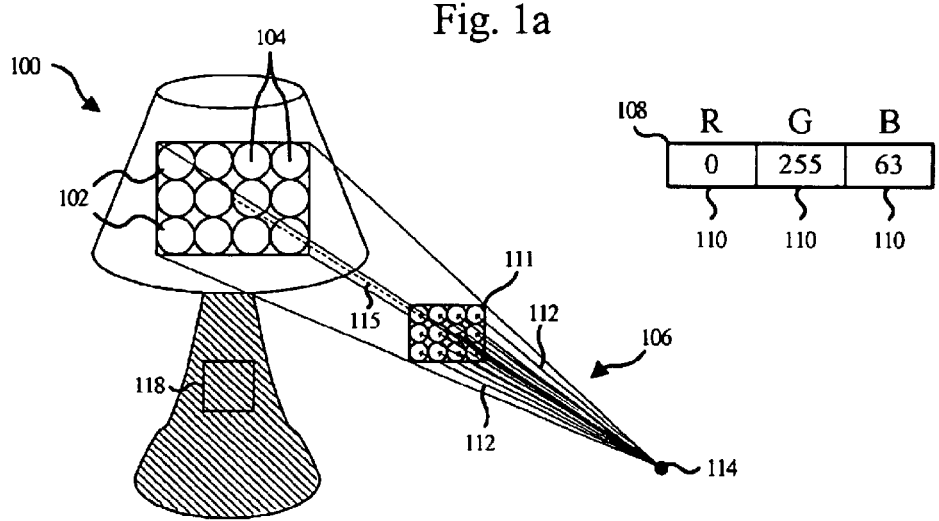
FIG. 1a is partially schematic respective view depicting a prior art method of rendering a graphical object.
Figure 1B:
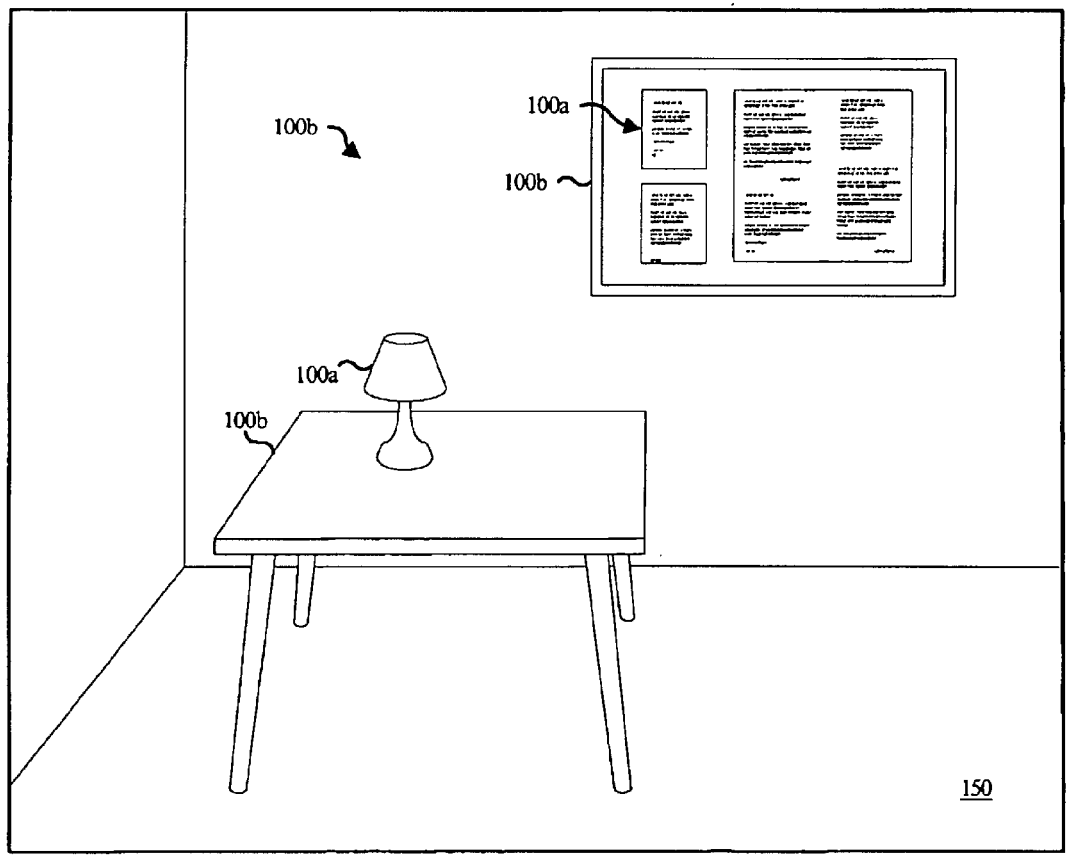
FIG. 1b is a perspective view of a graphical scene in accordance with graphical rendering systems.
Figure 2:
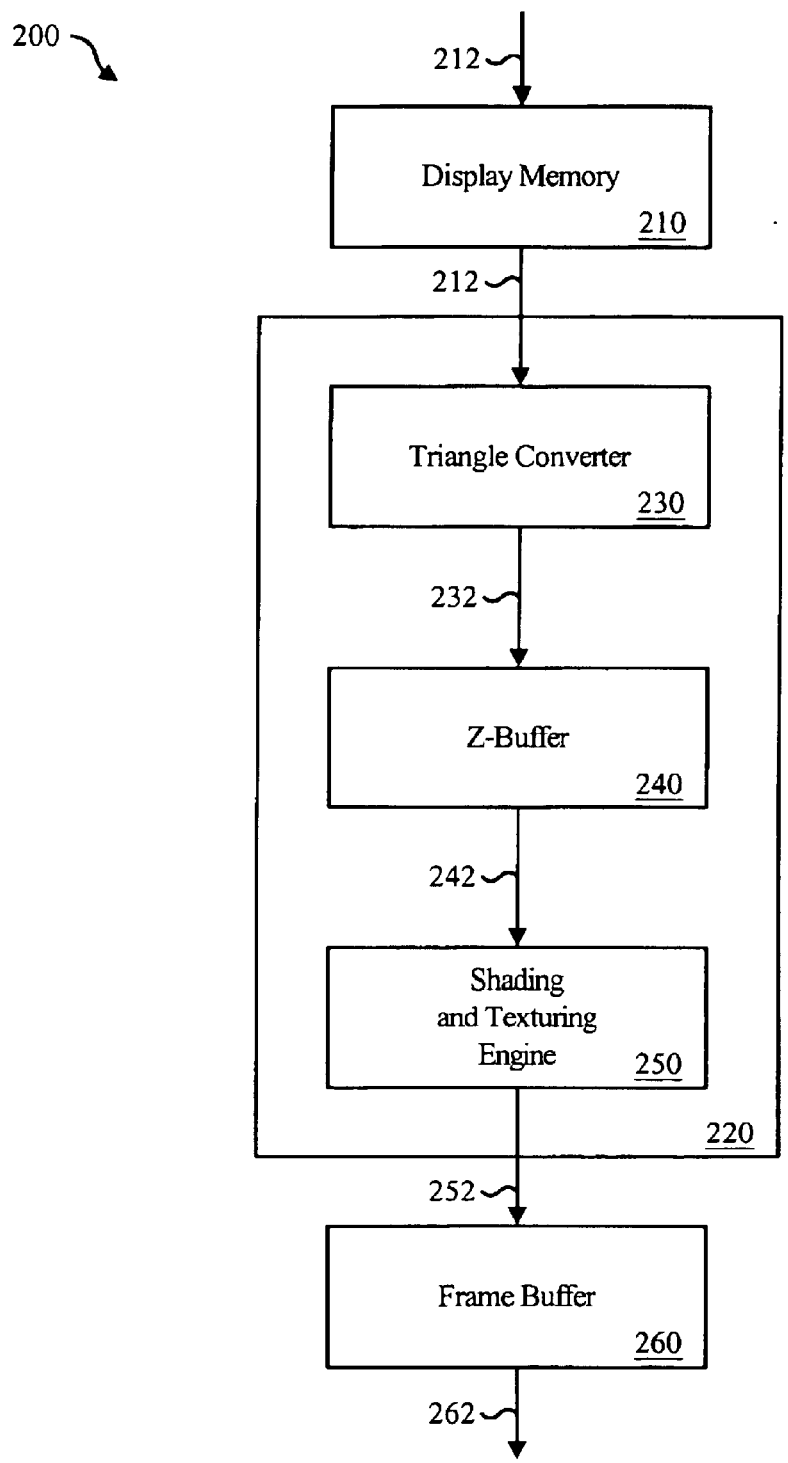
FIG. 2 is a schematic block diagram depicting a prior art graphics pipeline.
Figure 3:
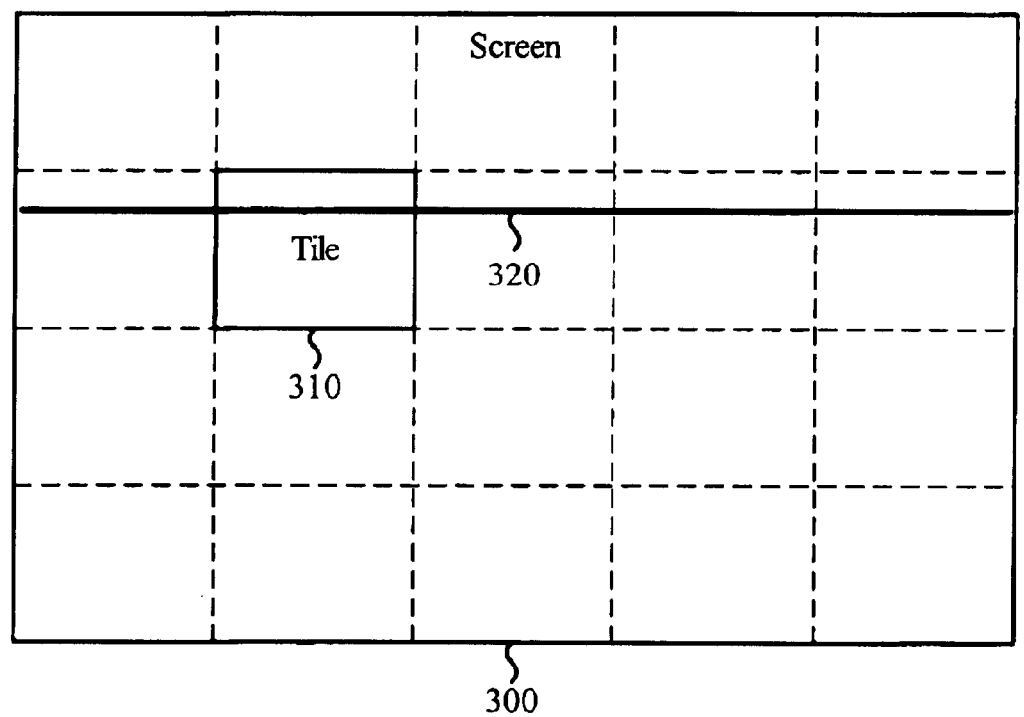
FIG. 3 is a chart depicting a prior art tile-based rendering method.

Referring to FIG. 16, a ray bundle 1610 may be comprised of diverging rays 1612 that originate from the focal point 114 of the perspective viewer 106 shown in FIG. 1a. With diverging rays, the volume 1512 increases with each successive cast due to the increase in width 1514 and height 1516. In one embodiment, proper proximity testing is maintained by recalculating the distance 1540 and selecting a proximity mask with an object enlargement that is greater than or equal to the distance 1540.

Figure 17A:
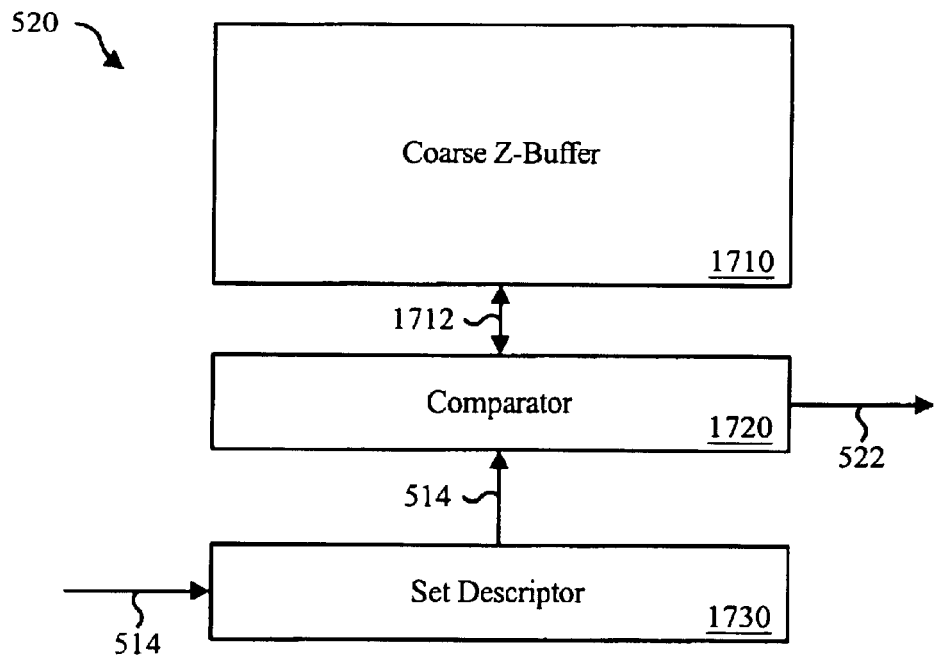
FIG. 17a is a schematic block diagram depicting one embodiment of an occlusion detection apparatus of the present invention.

Referring to FIG. 17a, one embodiment of the occlusion detector 520 of FIG. 5 includes a coarse z-buffer 1710, a comparator 1720, and a register 1730. The coarse z-buffer 1710 is in one embodiment essentially a specialized memory containing the shallowest known pixel depth for each pixel position in the graphical scene 150. The shallowest known depth is the shallowest depth encountered at each pixel position for the pixels that have already been processed by the occlusion detector 520. The shallowest known pixel depth is referred to herein as the current occlusion depth.

The data bus 1712 carries the depth information that is stored within the coarse z-buffer. In one embodiment, the data bus 1712 is a parallel bus that is capable of accessing an entire row of depth information within the coarse z-buffer 1710. In another embodiment, the data bus 1712 (and the pixel set mask 522) is a convenient width such as 32 bits and multiple accesses must be conducted to access an entire row of depth information. The entire row of depth information preferably corresponds to a row of pixels within the graphical scene 150. The depth information is preferably coarse, i.e., of a reduced resolution in that complete pixel pruning is not required by the occlusion detector 520.

Using coarse depth information (i.e., a reduced number of bits to represent the depth) facilitates pruning the majority of occluded pixels while using a relatively small memory as the coarse z-buffer 1710. In one embodiment, the coarse z-buffer 1710 is used in conjunction with depth shifting in which graphical rendering is localized to a specific depth range and the display lists are sorted in depth (front-to-back) order to facilitate depth localization.

Depth shifting or depth localization is a method developed in conjunction with the present invention to maximize the usefulness of the coarse z-buffer. Depth shifting comprises shifting a depth range during the rendering process thereby focusing the resolution of the coarse z-buffer to a particular range of z values. In the preferred embodiment, a current minimum depth is maintained along with a current coarseness, for example, a multiplier or exponent, indicating the resolution of the z values stored within the coarse z-buffer. Depth shifting is preferably conducted in conjunction with depth ordered rendering, and the current coarseness is adjusted to match the density of primitives being rendered at the current depth.

In one embodiment, depth shifting comprises subtracting an offset from each z value within the z-buffer, with values below zero being set to zero. In another embodiment, depth shifting comprises subtracting an offset as well as bit shifting each of the z values to change the current coarseness of values contained in the coarse z-buffer. In yet another embodiment, depth shifting comprises adding an offset to the values in the course z-buffer and setting overflowed depths to a maximum value and underflowed depths to a minimum value. In the presently preferred embodiment, the maximum z value represented in the coarse z-buffer indicates a location containing no pixel data, while the minimum value of zero represents a pixel generated at a shallower depth than the current minimum depth.

The register 1730 receives a pixel set descriptor 514 including depth information. In one embodiment, the pixel set descriptor 514 describes a horizontal span of consecutive pixels. The register 1730 provides the pixel set descriptor to the comparator 1720.

The comparator 1720 compares the minimum depth for the pixel set with each pixel's occlusion depth by accessing the occlusion depth for each pixel within the pixel set via the data bus 1712. The comparator 1720 provides the pixel set mask 522 indicating which pixels within the pixel set are known to be occluded. In the preferred embodiment, the comparator 1720 also compares the maximum depth for the pixel set with each pixel's occlusion depth and updates the contents of the z-buffer if the maximum depth is shallower than the current occlusion depth.

Figure 17B:
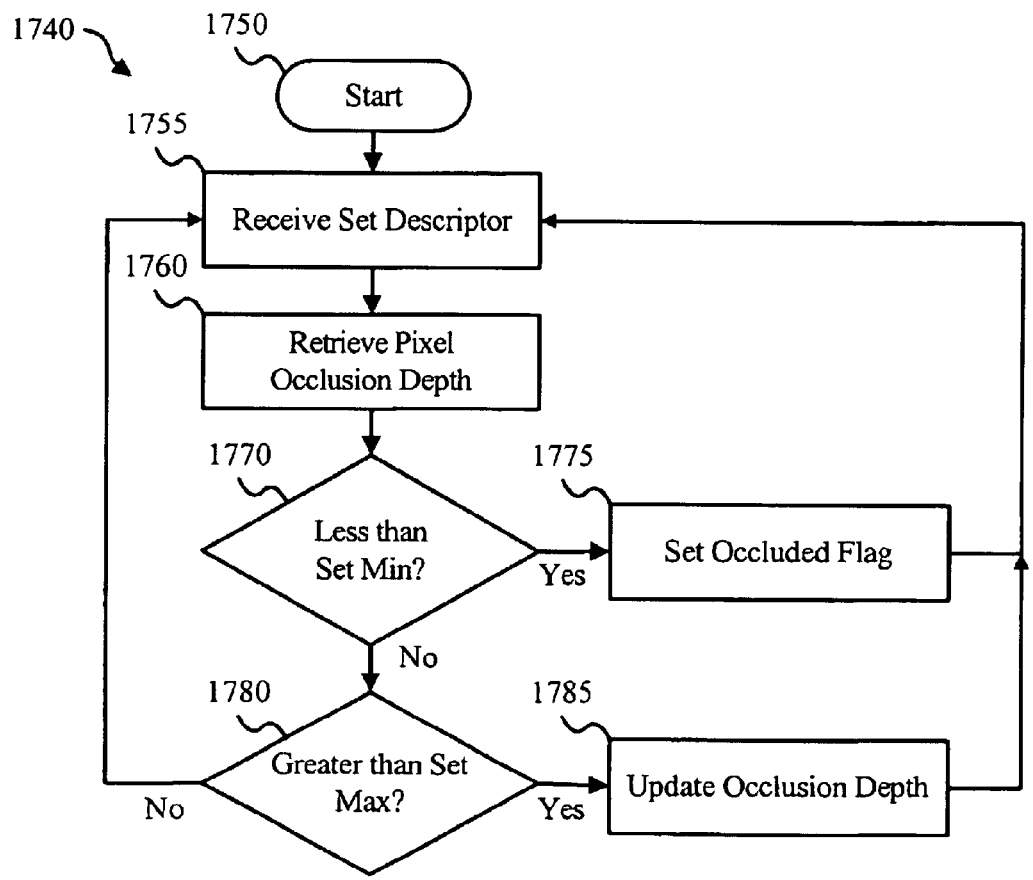
FIG. 17b is a flow chart diagram depicting one embodiment of an occlusion detection method of the present invention.

Referring to FIG. 17b, one embodiment of an occlusion detection method 1740 may be conducted in conjunction with the generate step 620 of the graphical rendering method 600 of the present invention. The occlusion detection method 1740 may also be conducted in conjunction with the occlusion detector 520. In the preferred embodiment, the occlusion detection method 1740 is used to conduct gated pixelization such that pixels that are known to be occluded are not included in subsequent rendering stages.

The occlusion detection method 1740 begins with a start step 1750 followed by a receive step 1755. The receive step 1755 receives a pixel set descriptor, such as the pixel set descriptor 514, that describes the extents of the pixel set being processed in conjunction with a graphical object such as the graphical object 100. The pixel set descriptor preferably includes depth information such as maximum and minimum depth. In one embodiment, the pixel set descriptor enumerates the starting and ending pixels of a span along with minimum and maximum depths.

The occlusion detection method 1740 facilitates specifying a depth range rather than requiring exact depth information for each pixel in the pixel set of interest. In most cases, a depth range comprising minimum and maximum depths is sufficient to prune a majority of non-visible pixels and update the occlusion depth. While the occlusion detection method 1740 may be used in a single pixel mode that specifies an exact pixel depth, the preferred embodiment comprises specifying a depth range for an entire set of pixels. Specifying a depth range for an entire set of pixels reduces the data bandwidth required to conduct occlusion detection.

The occlusion detection method 1740 proceeds from the receive step 1755 to a retrieve step 1760. The retrieve step 1760 retrieves the occlusion depth for the locations described by the pixel set descriptor. In one embodiment, the retrieve step 1760 is conducted by the comparator 1720 in conjunction with the coarse z-buffer 1710.

After the receive step 1755, the occlusion detection method 1740 conducts a minimum depth test 1770 on each pixel in the described pixel set. The minimum depth test 1770 ascertains whether the occlusion depth for a particular pixel location is less than the pixel set minimum. If so, the set flag step 1775 is conducted. Otherwise, a maximum depth test 1780 is conducted. The set flag step 1775 sets a flag for each pixel that passes the minimum depth test 1770. The pixels that pass the minimum depth test 1770 are known to be occluded, while the remaining pixels are potentially visible.

If the minimum depth test 1770 is false for some or all of the pixels in the pixel set of interest, the maximum depth test 1780 is conducted preferably only on those pixels that fail the minimum depth test 1770. The maximum depth test 1780 ascertains whether the occlusion depth for a particular pixel location is greater than the pixel set maximum. If so, the particular pixel is shallower than the occlusion depth and an update step 1785 is conducted to update the occlusion depth.

The maximum depth test 1780 and the update step 1785 ensure that the occlusion depth is only decreased and will not be increased while processing a graphical scene or frame. Successful occlusion depth updates are contingent on the maximum depth being valid for the entire set of pixels being considered. In those situations where it is not known if the graphical object occludes the entire set, such as certain embodiments of the ray casting method 1200, occlusion depth updates may be deferred until an actual ray collision occurs thereby removing uncertainty and possible erroneous updates. After the update step 1785, the occlusion detection method 1740 then loops to the receive step 1755 to process other objects and pixel sets.

Bucket sorting is an efficient method of sorting data elements that use a data key or portion thereof to index into a set of buckets followed by placement of the data elements within the indexed buckets. Sorting postal mail into zip codes is an example of the concept of bucket sorting. Bucket sorting is preferably conducted on a coarse basis to reduce the number of buckets to a manageable level. Multiple passes may be conducted to achieve finer sorting.

Figure 18A:
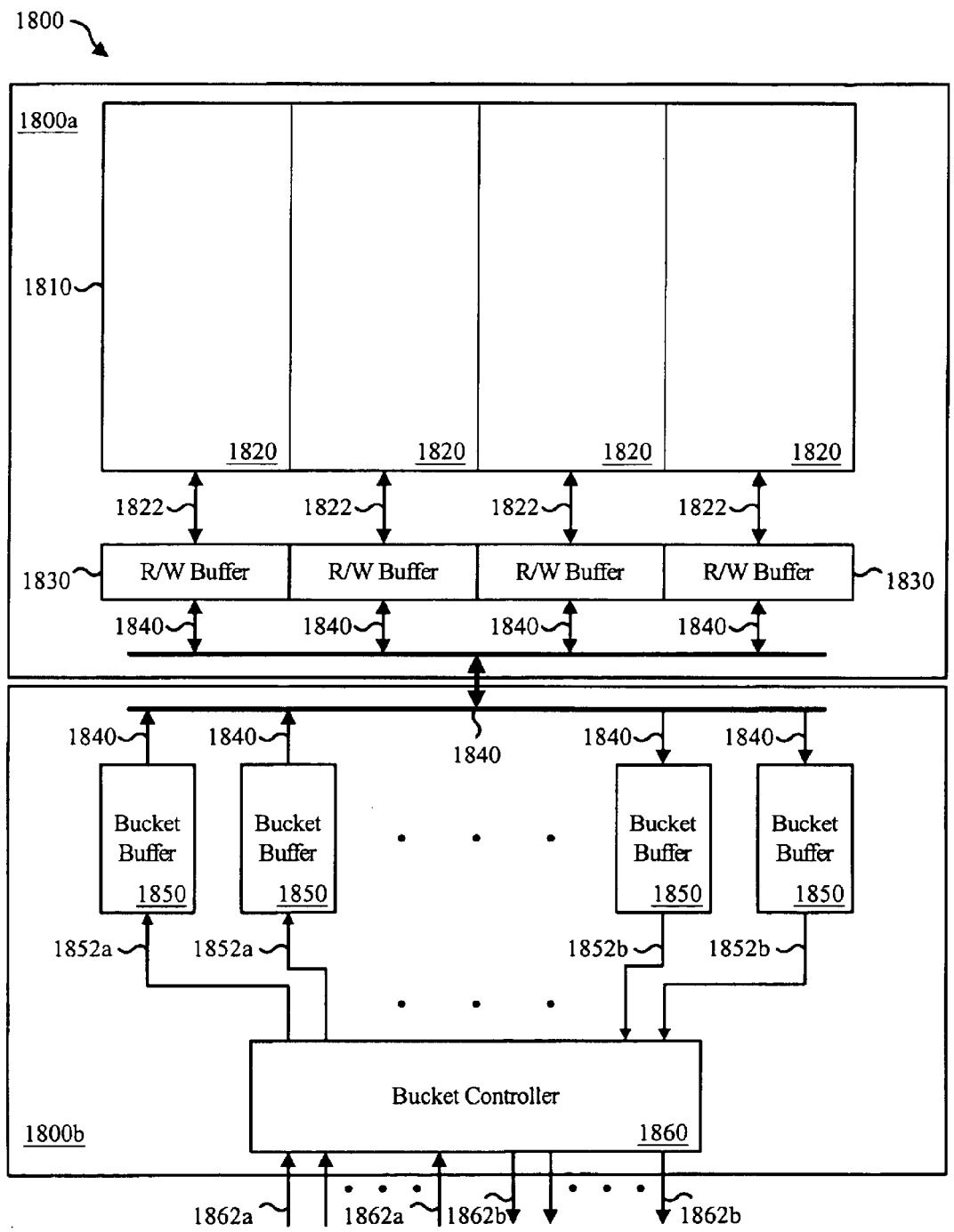
FIG. 18a is a schematic block diagram depicting one embodiment of a bucket sorting apparatus of the present invention.

Referring to FIG. 18a, one embodiment of a bucket sorter 1800 includes a memory array 1810 comprised of multiple array columns 1820. The array columns 1820 each send and receive data via a column bus 1822 to and from a memory buffer 1830. The memory buffers 1830 are also connected to a bidirectional memory bus 1840.

The memory bus 1840 provides an interface to a set of bucket buffers 1850. In the depicted embodiment, some of the bucket buffers 1850 are bucket write buffers 1850a, while others are bucket read buffers 1850b. The bucket write buffers 1850a receive data and control information from a bucket controller 1860 via a set of sorter input ports 1852a. The bucket read buffers 1850b receive control information and provide data to the bucket controller 1860 through a set of sorter output ports 1852b.

The bucket buffers 1850 are essentially cache memory for the memory array 1810 that is under intelligent control of the bucket controller 1860. The bucket controller 1860 orchestrates the movement of data within the bucket sorter 1800 to effect sorting operations. The architecture of the bucket sorter 1800 facilitates sorting data that is already within the memory array 1810. In certain embodiments, multiple sorting passes may be conducted on data within the memory array 1810. In one embodiment, one or more of the bucket write buffers 1850a is a miscellaneous bucket that is resorted after the initial sort. The bucket controller 1860 receives and provides bucket data externally through a set of bucket ports 1862 that, in the depicted embodiment, are partitioned into bucket write ports 1862a and bucket read ports 1862b.

In one embodiment, the bucket controller 1860 assigns bucket ID's to each bucket buffer and transfers filled bucket write buffers 1850a to the memory array 1810 via a memory buffer 1830 and fills empty bucket read buffers 1850b in like fashion. The memory bus 1840, the memory buffer 1830, the column bus 1822, and the array columns 1820 are preferably wide enough to transfer an entire bucket buffer in one bus cycle.

The bucket controller 1860 is preferably equipped with a mechanism to track the placement of bucket data within the memory array 1810. In one embodiment, the tracking mechanism references a memory assignment table, while in another embodiment the tracking mechanism manages a set of linked lists. The bucket controller 1860 may dedicate particular bucket buffers 1850 to store tracking data. The bucket controller 1860 may also store tracking data within the memory array 1810. The components of the bucket sorter 1800 may be partitioned into a memory 1800a and a sorter 1800b.

Figure 18B:
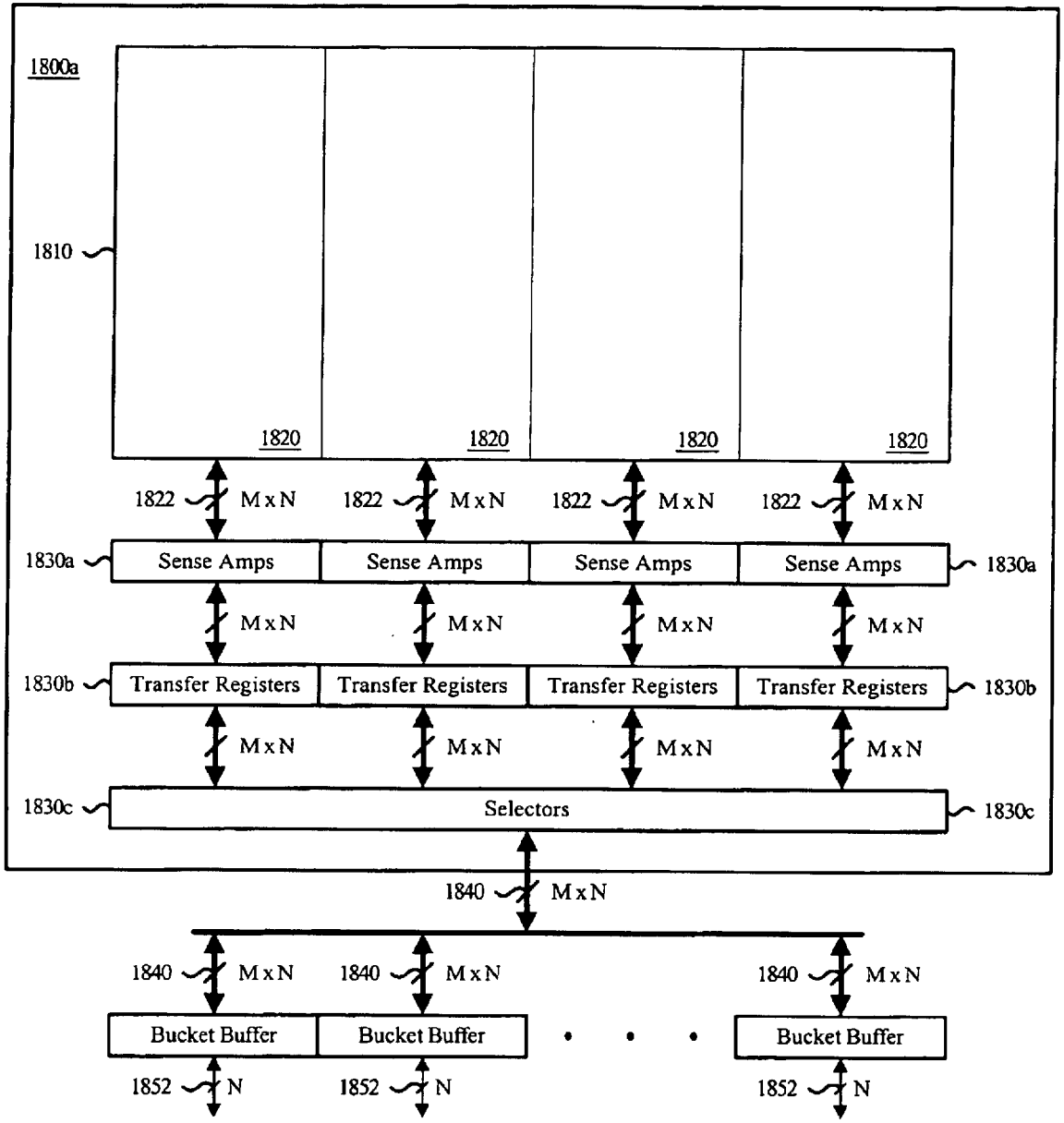
FIG. 18b is a schematic block diagram depicting an on-chip embodiment of a bucket sorting apparatus of the present invention.

FIG. 18b shows additional detail of specific elements related to an on-chip embodiment of the bucket sorter 1800. The depicted embodiment is configured to utilize embedded DRAM using wide data paths to increase available bandwidth and bucket sorting performance. In the depicted embodiment, each memory buffer 1830 includes multiple sense amps 1830a, one or more transfer registers 1830b, and a data selector 1830c. In one embodiment, the selectors comprise an multiplexor.

The depicted bucket buffers 1850 comprise an N bit interface to a bucket bus 1852 and an M×N bit interface to the memory bus 1840. In the depicted embodiment, each of the K bucket buffers 1850 may transfer data to and from the bi-directional memory bus 1840. In the preferred embodiment, the bits of the bucket buffer are interleaved to facilitate bit alignment and to reduce wiring complexity. For example, with a bucket buffer of M locations of N bit words, the bits of the bucket buffer are arranged such that the bit cells of the least significant bits from each of the M memory locations are located on one end of the bucket buffer, while the bit cells of the most significant bits are located on the other end of the bucket buffer. Such an arrangement facilitates efficient routing of the bitlines from the sorter parts 1852.

The data selectors 1830c direct the M×N bits of the memory bus 1840 to and from one of J sets of one or more transfer registers 1830b. Each set of the transfer registers 1830b hold data for one or more data transfers to and from the memory array 1810. The memory transfers also pass through the sense amps 1830a.

With the depicted organization, the selectors 1830c are preferably configured as N×M, J-to-1 single bit selectors, where each of the N×M single bit data selectors transfers (and aligns) one bit from the memory bus 1840 to and from a corresponding bit of one of J transfer registers 1830b. The J transfer registers in turn are aligned with, and correspond to, the J sense amp arrays 1830a and the J column arrays 1820 of the memory 1810.

For clarity purposes, the column or rays 1820, the sense amps 1830a, and the transfer registers 1830b are shown logically in separate columns. In the actual physical layout of the aforementioned elements, the bit columns are interleaved such that each element spans the width of the memory array 1810.

The depicted organization facilitates alignment of the data bits from the bucket buffers 1850 with those of the memory array 1810, thereby minimizing on-chip real estate dedicated to wiring paths between the depicted elements.

Figure 19:
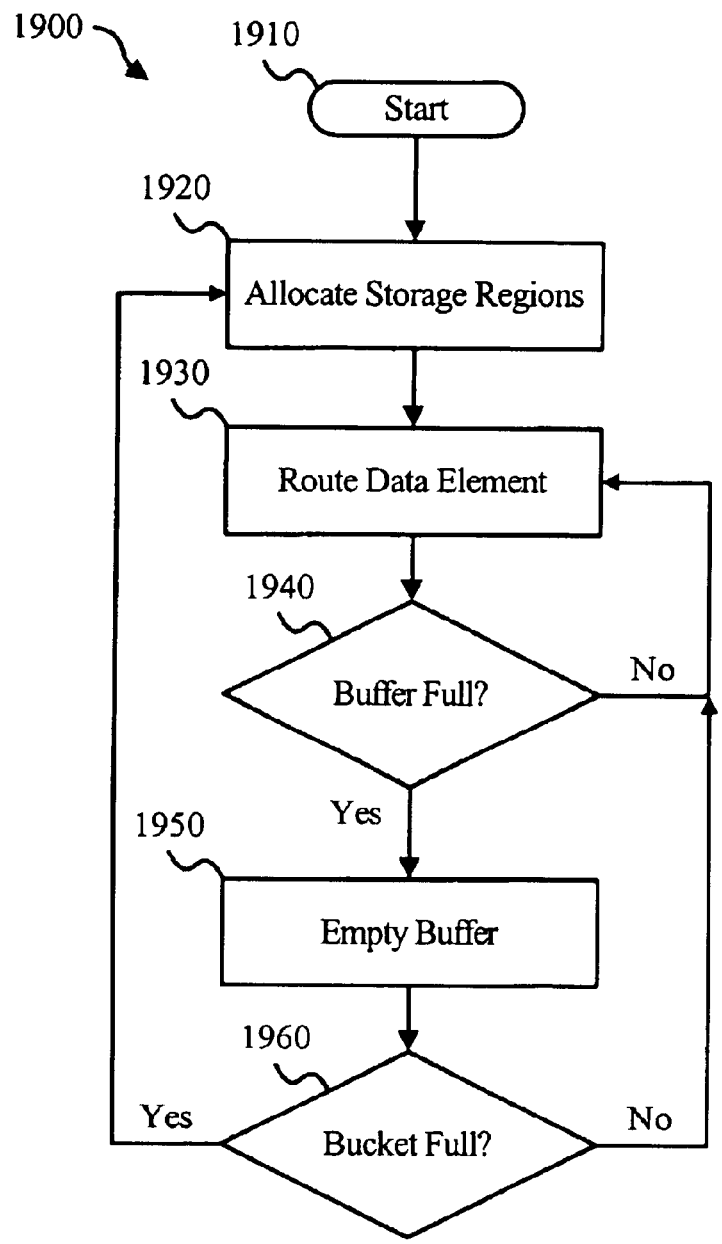
FIG. 19 is a flow chart diagram depicting one embodiment of a bucket sorting method of the present invention.

Referring to FIG. 19, one embodiment of a bucket sorting method 1900 may be conducted independently of or in conjunction with the bucket sorter 1800. The bucket sorting method 1900 commences with a start step 1910 followed by an allocate step 1920. The allocate step 1920 allocates storage regions within a memory such as the memory array 1810 that are assigned to specific "buckets."

Bucket buffers such as the bucket buffers 1850 may also be assigned to buckets, although in certain embodiments there are fewer bucket buffers than actual buckets. In these embodiments, some bucket buffers may be assigned to a "miscellaneous" or "other" bucket whose contents must be resorted when additional bucket buffers are available. Sorting may also be conducted recursively by dividing available bucket buffers into groups for example by sorting on a sorting key one bit at a time.

The bucket sorting method 1900 proceeds from the allocate step 1920 to a route step 1930. The route step 1930 writes a data element within the bucket write buffer 1850a that corresponds to a data key. The data element may be received via one of the bucket write ports 1862a, and for example, may be received from an external functional or one of the sorter output ports 1852b, such as when recursively sorting data. The data key may be part of the data element or the data key may be provided separately. After the route step 1930, the bucket sorting method 1900 proceeds to a buffer full test 1940.

The buffer full test 1940 ascertains whether the buffer that was written to is full. In one embodiment, the buffer full test comprises checking a signal from the particular bucket write buffer 1850a. If the buffer full test is not true, the bucket sorting method 1900 loops to the route step 1930. Otherwise, the method proceeds to an empty buffer step 1950.

The empty buffer step 1950 transfers the contents of a bucket buffer such as the bucket buffer 1850 to a region of memory associated with a particular bucket. In certain embodiments, the empty buffer step 1950 is followed by a bucket full test 1960. The bucket full test 1960 ascertains whether the region of memory associated with a particular bucket is full.

If the tested bucket is full, the bucket sorting method 1900 loops to the allocate step 1920 where in one embodiment additional memory is allocated. Otherwise, the bucket sorting method 1900 loops to the route step 1930 to process additional data elements. The buffer full test 1940, the empty buffer step 1950, and the bucket full test 1960 are preferably conducted in parallel for each bucket buffer.

Figure 20A:
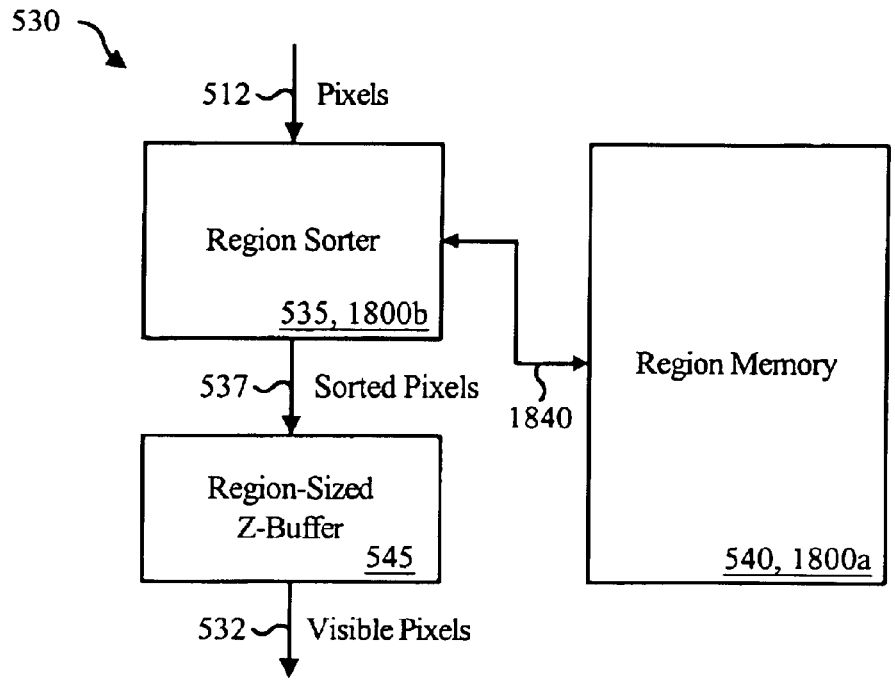
FIG. 20a is a schematic block diagram depicting one embodiment of a sorting z-buffer apparatus of the present invention.

Referring to FIG. 20a, one embodiment of the sorting z-buffer 530 uses the bucket sorter 1800 to embody the sorting z-buffer 530. Specifically, the region sorter 535 comprises the bucket buffers 1850 and the bucket controller 1860, while the region memory 540 comprises the memory array 1810 and the read/write buffers 1830.

Figure 20B:
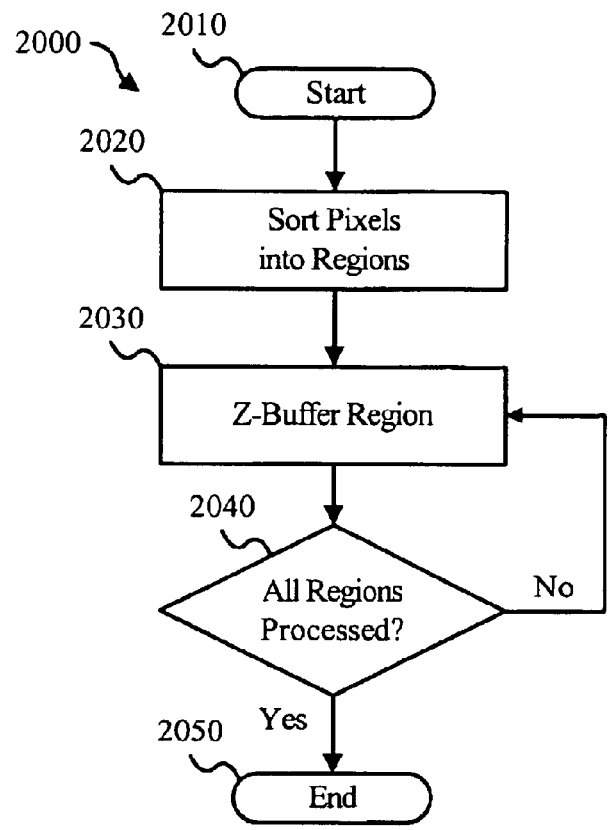
FIG. 20b is a flow chart diagram depicting one embodiment of a sorting z-buffer method of the present invention.

Referring to FIG. 20b, one embodiment of a sorting z-buffer method 2000 of the present invention may be used in conjunction with, or independently of, the sorting z-buffer 530. The sorting z-buffer method 2000 commences with a start step 2010, followed by a sort step 2020. The sort step 2020 sorts pixels such as the potentially visible pixels 512 into regions. In one embodiment the regions are a rectangular region of the graphical scene 150 that is a small portion of the tile 310 and the sort step 2020 is conducted by the bucket sorter 1800.

The sort step 2020 is followed by a z-buffer step 2030. The z-buffer step 2030 maintains the shallowest pixel for each x,y position with a region. The z-buffer step 2030 processes the pixels for an entire region resulting in visible pixels for the processed region such as the visible pixels 532.

The sorting z-buffer method 2000 proceeds from the z-buffer step 2030 to a regions processed test 2040. The regions processed test 2040 ascertains whether all the sorted regions have been processed by the z-buffer step 2030. If not, the sorting z-buffer method 2000 loops to the z-buffer step 2030. Otherwise, the sorting z-buffer method 2000 terminates 2050.

Figure 21A:
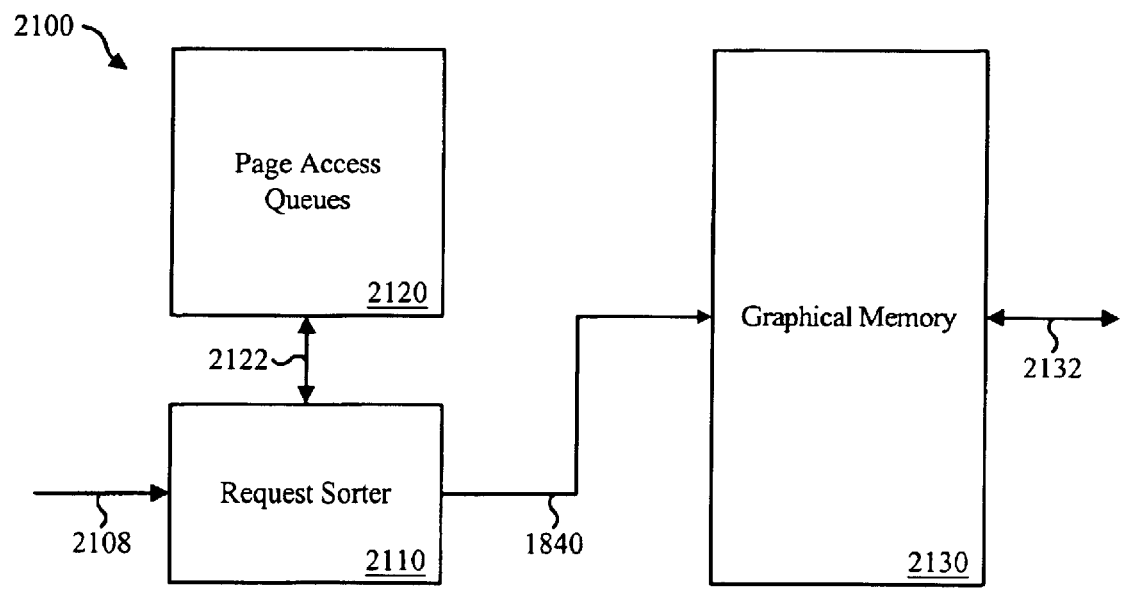
FIG. 21a is a schematic block diagram depicting one embodiment of a graphics memory localization apparatus of the present invention.

Referring to FIG. 21a, one embodiment of a graphics memory localizer 2100 increases the locality of memory accesses and includes a request sorter 2110, a set of page access queues 2120, and a graphics memory 2130. The request sorter 2110 may be embodied as the sorter 1800b, while the page access queues may be embodied as the memory 1800a. The graphics memory 2130 may be embodied as random access memory comprised of internal and external DRAM.

The request sorter 2110 receives an access request 2108, which in one embodiment comprises an address field, a data field, and an operation field. Multiple access requests 2108 are received and sorted into the page access queues 2120 via an access bus 2122. The request sorter 2110 also retrieves sorted requests from the page access queues and directs the sorted requests to the graphics memory 2130 via the memory bus 1840. Sorting the memory access requests into page queues facilitates increased page hits within the graphics memory 2130, thereby increasing the rendering performance within a graphical system. The graphics memory 2130 provides data to a data bus 2132.

Figure 21B:
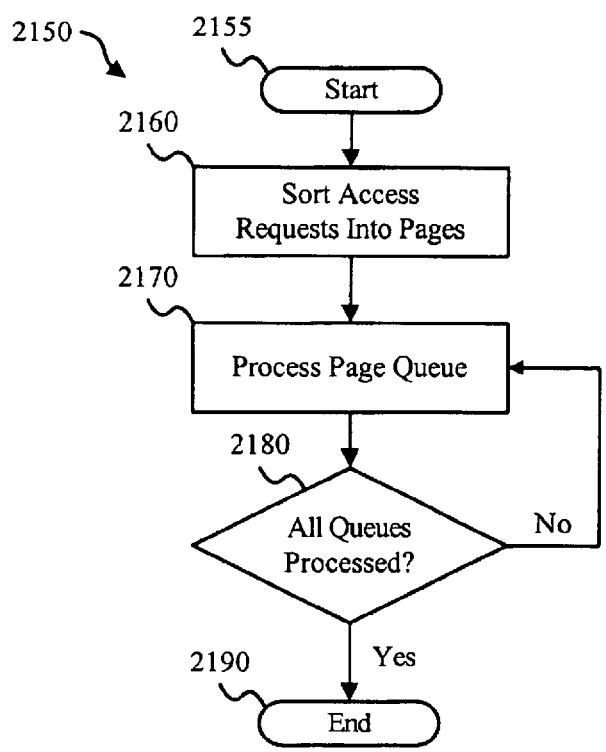
FIG. 21b is a flow chart diagram depicting one embodiment of a graphics memory localization method of the present invention.

Referring to FIG. 21b, one embodiment of a graphics memory localization method 2150 may be conducted independently of, or in conjunction with, the graphics memory 2100. The graphics memory localization method 2150 commences with a start step 2155 followed by a sort step 2160. The sort step 2160 sorts a preferably large number of access requests into a set of page queues. The sort step 2160 is followed by a process queue step 2170.

The process queue step 2170 processes the requests from one page queue. When conducted in conjunction with cached or paged memory, processing the requests from a single page queue results in sustained cache or page hits. By sorting access requests, the graphics memory localization method 2150 significantly increases the level of performance attainable with memory subsystems such as, for example, a subsystem using page mode DRAM or the like wherein localized (i.e., page mode) memory accesses are much faster than non-localized (i.e., normal) memory accesses.

The graphics memory localization method 2150 proceeds from the process queue step 2170 to a queues processed test 2180. The queues processed test 2180 ascertains whether all the page queues have been processed. If not, the graphics memory localization method 2150 loops to the process queue step 2170 otherwise the method terminates 2190.

Figure 22:
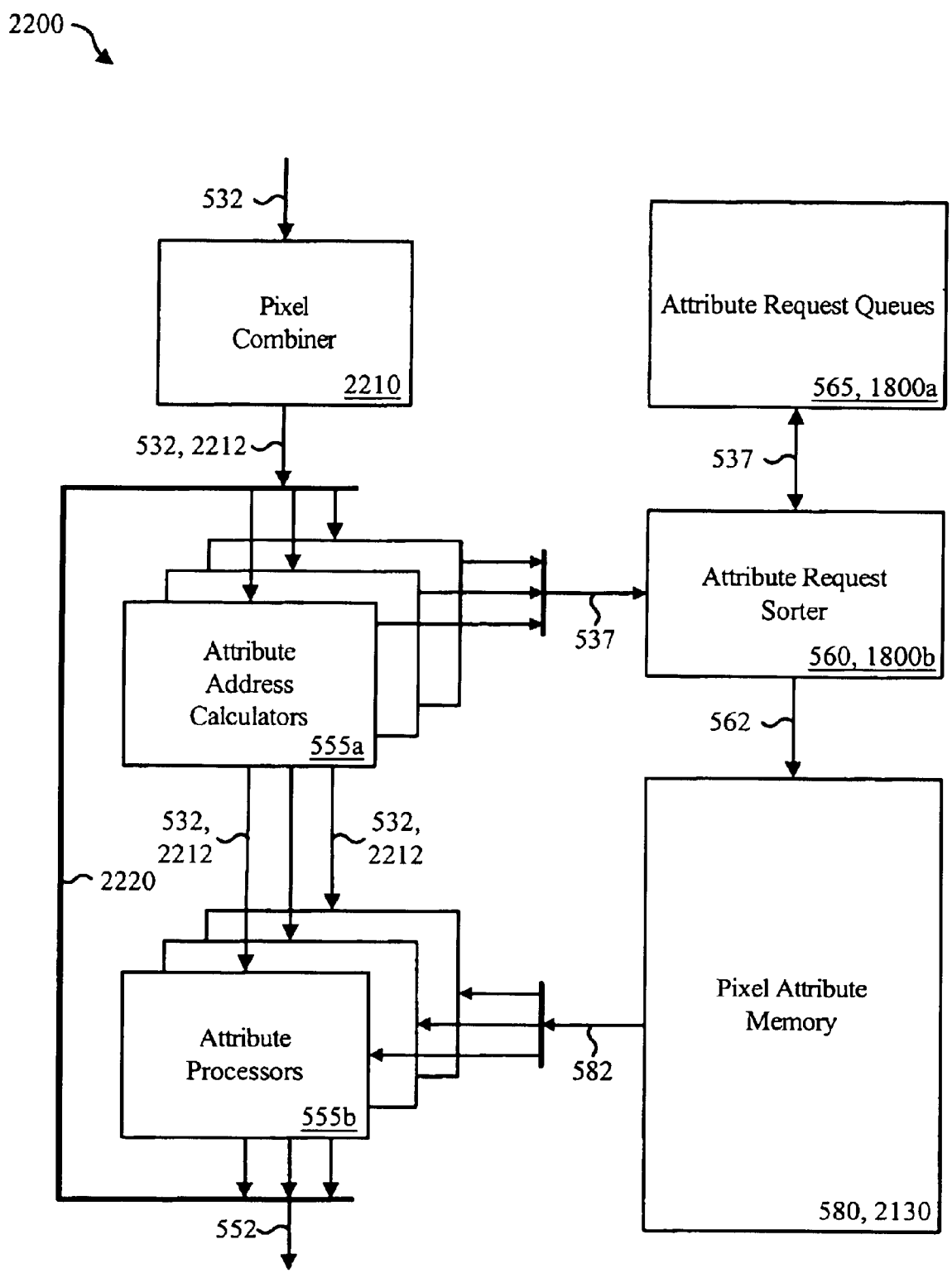
FIG. 22 is a schematic block diagram depicting one embodiment of a pixel colorization apparatus of the present invention.

FIG. 22 relates the certain elements of the graphics engine with the bucket sorter 1800. A pixel colorizer 2200 includes a set of address calculators 555a, a set of attribute processors 555b, the attribute request sorter 560, the attribute request queues 565, and the pixel attribute memory 580. The address calculators 555a and the attributes processors 555b may comprise the pixel colorizers 555 shown in FIG. 5, while the pixel colorizer 2200 may be contained within the graphics engine 480.

In the depicted embodiment, the pixel colorizer 2200 includes a pixel combiner 2210. The pixel combiner 2210 is preferred in embodiments that conduct super-sampled rendering. Super-sampled rendering increases visual quality by rendering a set of pixels for each output pixel. The set of rendered pixels are filtered (i.e., smoothed) to provide each output pixel.

The pixel combiner 2210 examines the visible pixels 532 that comprise a single output pixel. The pixel descriptors of pixels associated with an output pixel are accessed to ascertain whether some or all the pixels may be combined into a representative pixel 2212. If not, the visible pixels 532 are passed along without combining them.

In one embodiment, combining is performed if multiple pixels originate from the same patch and texture. In such cases it may not be advantageous to conduct texture lookups, and shading for all of those subpixels, the associated visible pixels 532 are discarded from further rendering with the exception of the representative pixel 2212. The representative pixel 2212 is preferably the center pixel in the set of pixels of the pixels it represents.

In the depicted embodiment, the address calculators 555a compute a memory address associated with an attribute of interest. The memory address is presented as the attribute request 557. The attribute request is handled by the request sorter 560 in the manner related in the description of FIG. 5 and provides the sorted attribute requests 562.

The attribute processors 555b receive the visible pixels 532 or the representative pixels 2210 along with the pixel attributes 582 and provide the colorized pixels 552. The colorized pixels 552 may be recirculated within the pixel colorizer 2200 via a recirculation bus 2220. Recirculation facilitates the acquisition of additional attributes for each pixel.

Figure 23:
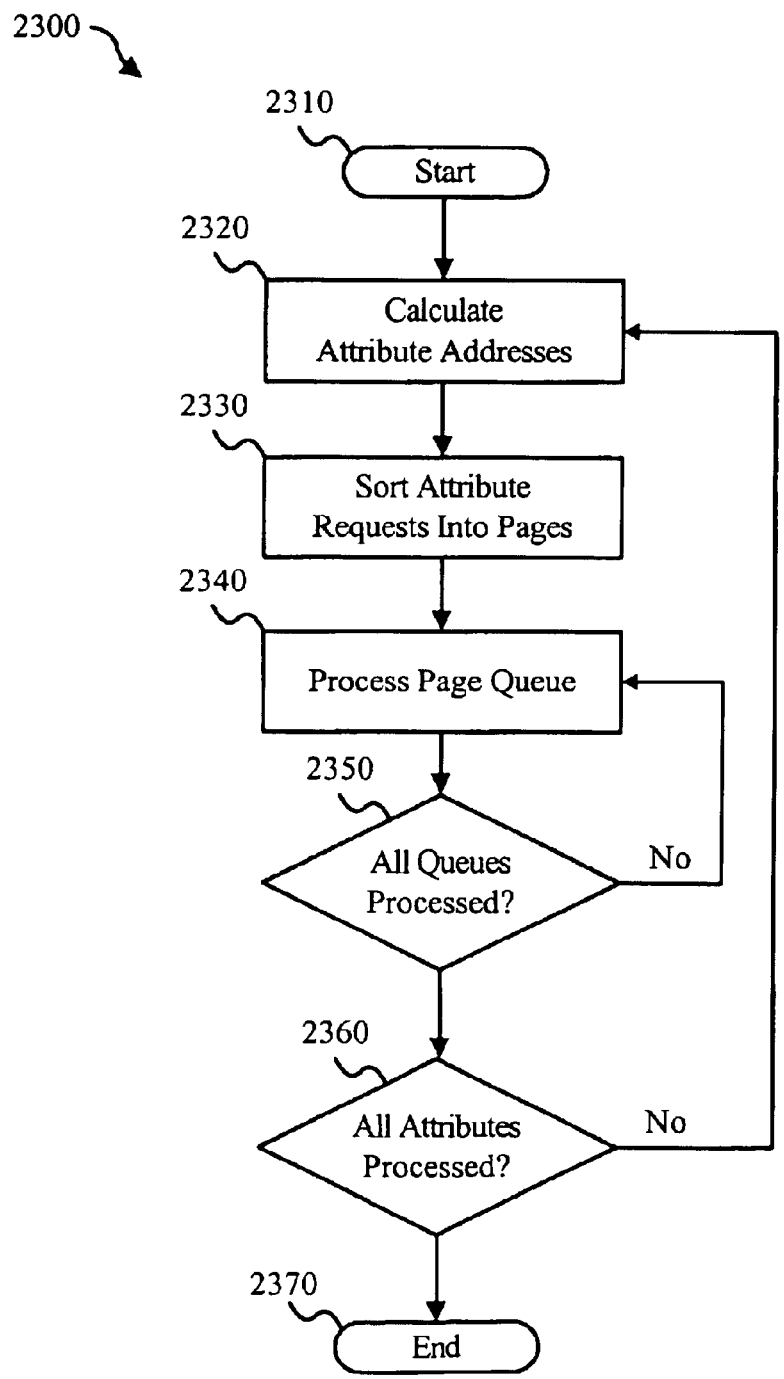
FIG. 23 is a flow chart diagram depicting one embodiment of a pixel colorization method of the present invention.

Referring to FIG. 23, one embodiment of a pixel colorization method 2300 of the present invention may be conducted independently of, or in conjunction with, the pixel colorizer 2200 or the graphics engine 480. The pixel colorization method 2300 begins with a start step 2310 followed by a calculate address step 2320, a sort requests step 2330, and a process queue step 2340.

The calculate address step 2320 computes a memory address for a needed attribute such as a color table entry, a texture map, shading data, and the like. The needed attributes may be dependent on the type of object from which the pixels originated. The calculate address step 2320 is preferably conducted for a large number of pixels such as the visible pixels 532. The pixel colorization method 2300 contributes to the localization of memory references by processing the same needed attribute for every pixel in the pixels of interest. Typically, accessing the same attribute focuses the memory references to a relatively small portion of a graphics memory such as the pixel attribute memory 580.

The sort requests step 2330 sorts the preferably large number of the calculated addresses into page queues to further increase the locality of memory references. The process queue step 2340 accesses a memory such as the pixel attribute memory 580 with the sorted addresses. In one embodiment, the process queue step 2340 uses the retrieved attribute information to colorize the visible pixels 532.

The pixel colorization method 2300 proceeds from the process queue to a queues processed test 2350. The queues processed test 2350 ascertains whether every page queue with a pending request has been processed. If not, the pixel colorization method 2300 loops to the process queue step 2340. Otherwise, the method proceeds to an attributes processed test 2360.

The attributes processed test 2360 ascertains whether all relevant attributes have been processed for the pixels of interest such as a frame of visible pixels 532. If not, the pixel colorization method 2300 loops to the calculate address 2320. Otherwise, the pixel colorization method 2300 terminates at an end step 2370.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. A method for recursive ray casting, the method comprising:
    providing a ray bundle of a selected position, direction and size;
    conducting a bundle proximity test of a selected proximity at the selected position;
    advancing the ray bundle a first casting distance when the bundle proximity test is negative; and
    subdividing the ray bundle into child bundles when the bundle proximity test is positive.

2. The method of claim 1, wherein the first casting distance corresponds to the selected proximity.

3. The method of claim 1, wherein the size of the ray bundle corresponds to the selected proximity.

4. The method of claim 1, further comprising advancing a second casting distance when the bundle proximity test is positive.

5. The method of claim 1, further comprising retreating a second casting distance when the bundle proximity test is positive.

6. The method of claim 1, further comprising traversing and subdividing until each child bundle is a single ray.

7. The method of claim 1, wherein subdividing comprises partitioning along the largest ray bundle dimension.

8. The method of claim 1, wherein subdividing comprises partitioning along each ray bundle dimension.

9. The method of claim 1, further comprising combining child bundles of a subdivided ray bundle when the bundle proximity test of the ray bundle is negative.

10. The method of claim 1, wherein the bundle proximity test comprises testing boolean flags.

11. The method of claim 1, wherein the bundle proximity test comprises accessing a distance grid.

12. The method of claim 1, wherein the bundle proximity test comprises accessing a list of proximate objects.

13. A method for recursive ray casting, the method comprising:
    providing a ray bundle of a selected position, direction and size;
    conducting a bundle proximity test of a selected proximity at the selected position;
    advancing the ray bundle a first casting distance when the bundle proximity test is negative, the first casting distance and the size of the ray bundle corresponding to the selected proximity;
    retreating a second casting distance and subdividing the ray bundle into child bundles when the bundle proximity test is positive; and
    advancing, subdividing and retreating until each child bundle is a single ray.

14. An apparatus for recursive ray casting, the apparatus comprising:
    a proximity tester configured to receive a bundle position and provide a first hit signal indicating whether the bundle position is proximate to a graphical object; and
    a bundle caster configured to advance the bundle position a first casting distance when the bundle position is not proximate to the graphical object; and
    the bundle caster further configured to subdivide the ray bundle into child bundles when the bundle position is proximate to the graphical object.

15. The apparatus of claim 14, further comprising an occlusion detector operably connected to the bundle caster, the occlusion detector configured to receive a pixel set descriptor and a minimum z-depth, and to provide a mask indicating which pixels within the pixel set are known to be occluded.

16. The apparatus of claim 15, wherein the pixel set is defined by an area selected from a scanline span, a rectangle, and a triangle.

17. The apparatus of claim 15, wherein the occlusion detector is configured to operate at a lower depth resolution than the bundle caster.

18. The apparatus of claim 14, wherein the bundle caster comprises at least one register file, each register file thereof coupled to an ALU.

19. The apparatus of claim 14, further comprising a collision tester configured to receive a ray position and provide a second hit signal indicating whether the ray position is on or within the graphical object.

20. The apparatus of claim 19, further comprising a ray caster configured to advance the ray position.

21. The apparatus of claim 20, wherein the ray caster comprises at least one register file, each register file thereof coupled to an ALU.

22. The apparatus claim 21, wherein the ray caster is operably connected to the occlusion detector.

23. The apparatus of claim 22, wherein the occlusion detector comprises:
    a z-buffer configured to store an occlusion depth for each of a plurality of pixels, the occlusion depth being a low resolution representation of pixel depth;
    a register configured to receive a pixel set descriptor describing a set of pixels including a minimum depth for the set; and
    a comparator configured to access the z-buffer and compare the minimum depth with the occlusion depth for each pixel within the set of pixels.

* * * * *